US012660977B1

(12) United States Patent
Yang

(10) Patent No.: US 12,660,977 B1
(45) Date of Patent: Jun. 23, 2026

(54) SCRAPER AND ACCESSORY FOR SCRAPER

(71) Applicant: Maya Technologies Limited, Hong Kong (CN)

(72) Inventor: Shanglin Yang, Hong Kong (CN)

(73) Assignee: Maya Technologies Limited, Hong Kong (CN)

( * ) Notice: Subject to any disclaimer, the term of this patent is extended or adjusted under 35 U.S.C. 154(b) by 0 days.

(21) Appl. No.: 19/263,483

(22) Filed: Jul. 9, 2025

(30) Foreign Application Priority Data

May 21, 2025 (EM) ......................... 015103498-0001
Jun. 10, 2025 (CN) ......................... 202521184028.5

(51) Int. Cl.
*A47L 13/08* (2006.01)
*B08B 1/16* (2024.01)

(52) U.S. Cl.
CPC .............. *A47L 13/08* (2013.01); *B08B 1/165* (2024.01)

(58) Field of Classification Search
USPC ............................................................ 30/169
See application file for complete search history.

(56) References Cited

U.S. PATENT DOCUMENTS 5,009,009 A * 4/1991 Stinson .................. B44D 3/164 15/236.01
5,924,203 A * 7/1999 Huang .................... B26B 5/003 30/162
2003/0136005 A1* 7/2003 Panfili ................... A47L 13/022 30/162
2004/0010920 A1* 1/2004 DeLillo ..................... B26B 5/00 30/142

FOREIGN PATENT DOCUMENTS

TW 202014587 A * 4/2020

OTHER PUBLICATIONS

English translation of TW-202014587-A, dated Apr. 16, 2020.*

* cited by examiner

*Primary Examiner* — Hwei-Siu C Payer

(57) ABSTRACT

A scraper and an accessory are provided. The scraper includes a scraper body and a scraper component. The scraper body is arranged with a first blade. The scraper component is arranged with a second blade. A width of the second blade is unequal to a width of the first blade. The scraper is configured to switch assembly states between using the first blade and using the second blade. When the scraper body and the scraper component are in a separated state, or the scraper component is assembled with the scraper body, the first blade is in a usable state. When the scraper body and the scraper component are in an assembled state, or the scraper component extends out from the scraper body, the second blade is in the usable state.

19 Claims, 28 Drawing Sheets

SCRAPER AND ACCESSORY FOR SCRAPER

CROSS-REFERENCE TO RELATED APPLICATIONS

This application claims the priorities of Chinese Patent Application No. 202521184028.5, filed with the China National Intellectual Property Administration on Jun. 10, 2025, and Registered Community Design Application No. 015103498-0001, filed with the European Union Intellectual Property Office on May 21, 2025, the disclosure of which is hereby incorporated by reference in their entireties.

FIELD

The present disclosure relates to the field of cleaning tools, and particularly to a scraper and an accessory for the scraper.

BACKGROUND

A scraper blade for cleaning in related art has a fixed width, requiring frequent tool changes for a single operation, resulting in low operating efficiency and inconvenient portability. For different widths of cleaning requirements, multiple independent scrapers are needed, making quick switching impossible, which is inconvenient for users to clean and leads to a poor user experience.

SUMMARY

The present disclosure provides a scraper. In one embodiment, the scraper may include a scraper body and a scraper component. The scraper body may be arranged with a first blade. The scraper component may be arranged with a second blade. A width of the second blade may be unequal to a width of the first blade. The scraper may be configured to switch assembly states between using the first blade and using the second blade. When the scraper body and the scraper component are in a separated state, or the scraper component is assembled with the scraper body, the first blade may be in a usable state. When the scraper body and the scraper component are in an assembled state, or the scraper component extends out from the scraper body, the second blade may be in the usable state.

The present disclosure provides an accessory. In one embodiment, the accessory may be used for a scraper. The scraper may include a first blade. The accessory may include a scraper component and a second blade. The scraper component can be detachably connected to the scraper. The second blade may be arranged on the scraper component. A width of the second blade may be greater than a width of the first blade. When the scraper component is connected to the scraper, the second blade may be in a usable state, or both the first blade and the second blade may be in the usable state.

BRIEF DESCRIPTION OF THE DRAWINGS

To provide a clearer illustration of the technical solutions in the embodiments of the present disclosure or in the related art, a brief introduction will be given to the drawings used in the description of the embodiments or the related art. It is obvious that the drawings described below are merely some embodiments of the present disclosure, and for those skilled in the art, other drawings can be obtained based on these drawings without creative efforts.

REFERENCE NUMERALS

Figure 1:
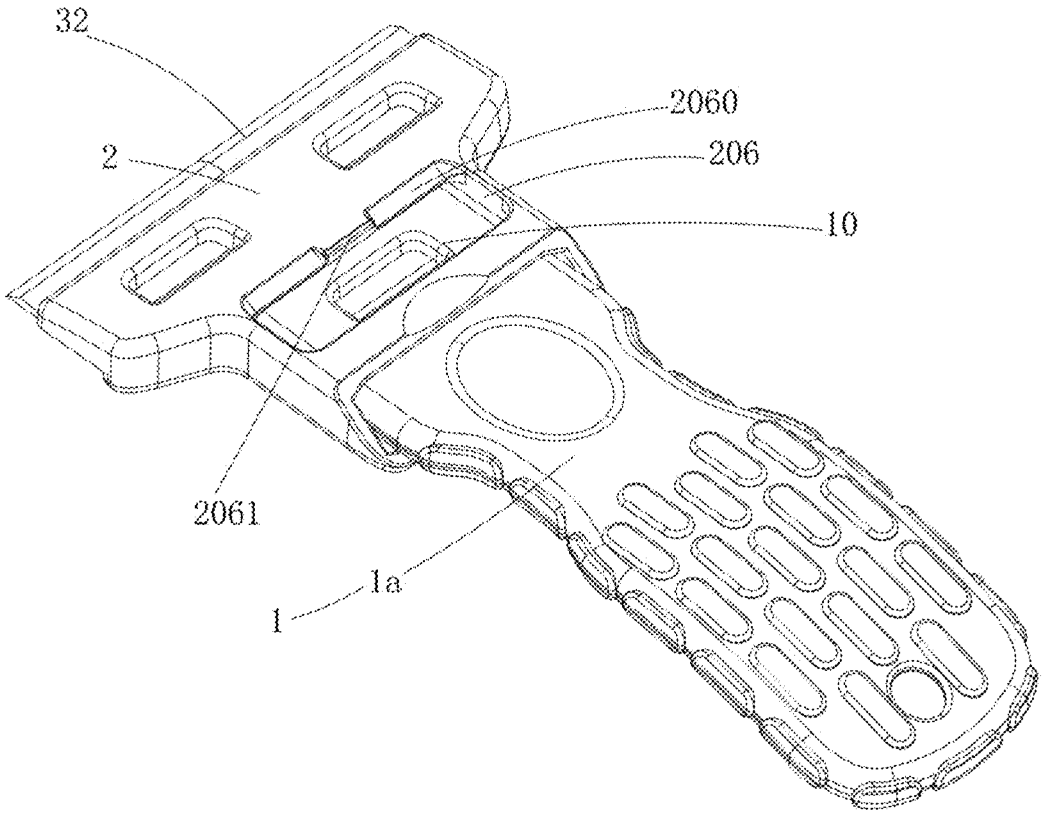
FIG. 1 is a schematic view of an overall structure of a scraper according to Embodiment I of the present disclosure, showing the scraper in a first assembled state.

1—scraper body; 1*a*—handle; 10—connecting end; 100—bottom face; 101—top face; 102—connecting protrusion; 103—first engaging recess; 104—abutting protrusion; 105—elastic snapping fastener; 106—limiting screw hole; 107—annular groove; 11—insertion hole; 12—guide hole; 121—first end; 122—second end; 13—limiting boss; 130—limiting wall; 131—guide wall; 14—second accommodating groove; 15—L-shaped hook;

2—scraper component; 20—connecting cavity; 200—opening; 201—first cavity; 2010—limiting face; 202—second cavity;

203—bottom wall; 204—top wall; 205—first limiting hole; 2051—first inclined wall; 2052—second inclined wall; 206—second limiting hole; 2060—third inclined wall; 2061—limiting protrusion; 207—side opening; 208—fastening through-hole; 209—annular protrusion; 21—insertion fastener; 22—first accommodating recess; 23—guide post; 24—inclined hole;

31—first blade; 310—second limiting snap recess; 311—second limiting snap protrusion; 312—third limiting snap recess; 32—second blade;

400—limiting bolt; 401—magnetic member;

5—mounting member; 51—first mounting wall; 510—first limiting snap strip; 511—first limiting snap recess; 512—first limiting snap protrusion; 52—second mounting wall;

α—first included angle; β—second included angle; D1—first direction; D2—second direction.

DETAILED DESCRIPTION

Unless otherwise defined, all technical and scientific terms used herein have the same meaning as commonly understood by those skilled in the art to which the present disclosure belongs. The terms used in the description of the present disclosure herein are intended for describing particular embodiments only and are not intended to limit the present disclosure. In the description, claims, and the above drawings of the present disclosure, the terms "including" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in conjunction with an embodiment may be included in at least one embodiment of the present disclosure. The appearance of the phrase at various places in the specification does not necessarily refer to the same embodiment, nor is it a separate or an alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

Referring to FIGS. 1-27, the present disclosure provides a scraper. The scraper may include a scraper body 1 and a scraper component 2. The scraper body 1 may be arranged with a first blade 31. The scraper component 2 may be arranged with a second blade 32. A width of the second blade 32 may be not equal to a width of the first blade 31. The scraper can switch assembly states between using the first blade 31 and using the second blade 32. When the scraper body 1 and the scraper component 2 are in a separated state or the scraper component 2 is assembled with the scraper body 1, the first blade 31 may be in a usable state. When the scraper body 1 and the scraper component 2 are in an assembled state or the scraper component 2 extends out from the scraper body 1, the second blade 32 may be in a usable state.

Specifically, the width of the second blade 32 can be set to be greater than the width of the first blade 31. In some embodiments, the width of the second blade 32 can further be twice the width of the first blade 31. Or two first blades 31 can be mounted side by side on the scraper component 2 to serve as the second blade 32. In this way, management and purchase of blades can be facilitated, allowing users to use the scraper by only purchasing a single specification of blade. The first blade 31 and the second blade 32 of different widths can allow users to choose a corresponding first blade 31 or second blade 32 for use according to usage needs, to meet diversified usage needs of users. Detaching the scraper component 2 from the scraper body 1 or storing the scraper component 2 in the scraper body 1 can enable the first blade 31 on the scraper body 1 to be exposed and to be in the usable state, and then the scraper body 1 can be held to push the first blade 31 for use. Conversely, assembling the scraper component 2 to the scraper body 1 in a predetermined manner or switching the scraper component 2 from being assembled with the scraper body 1 to extending out of the scraper body 1 can enable the second blade 32 to be exposed and to be in the usable state. In this case, the scraper body 1 can be held to push the second blade 32 for use. In summary, through the first blade 31 and the second blade 32 of different widths, the user's needs for different working scenarios can be met. During use, only a connection relationship between the scraper body 1 and the scraper component 2 needs to be switched to quickly switch between blades of different widths, making the first blade 31 or the second blade 32 in the usable state for work, and there is no need to repeatedly change different styles of scrapers or change blades of different widths of the scraper, thereby improving the user's experience.

Figure 2:
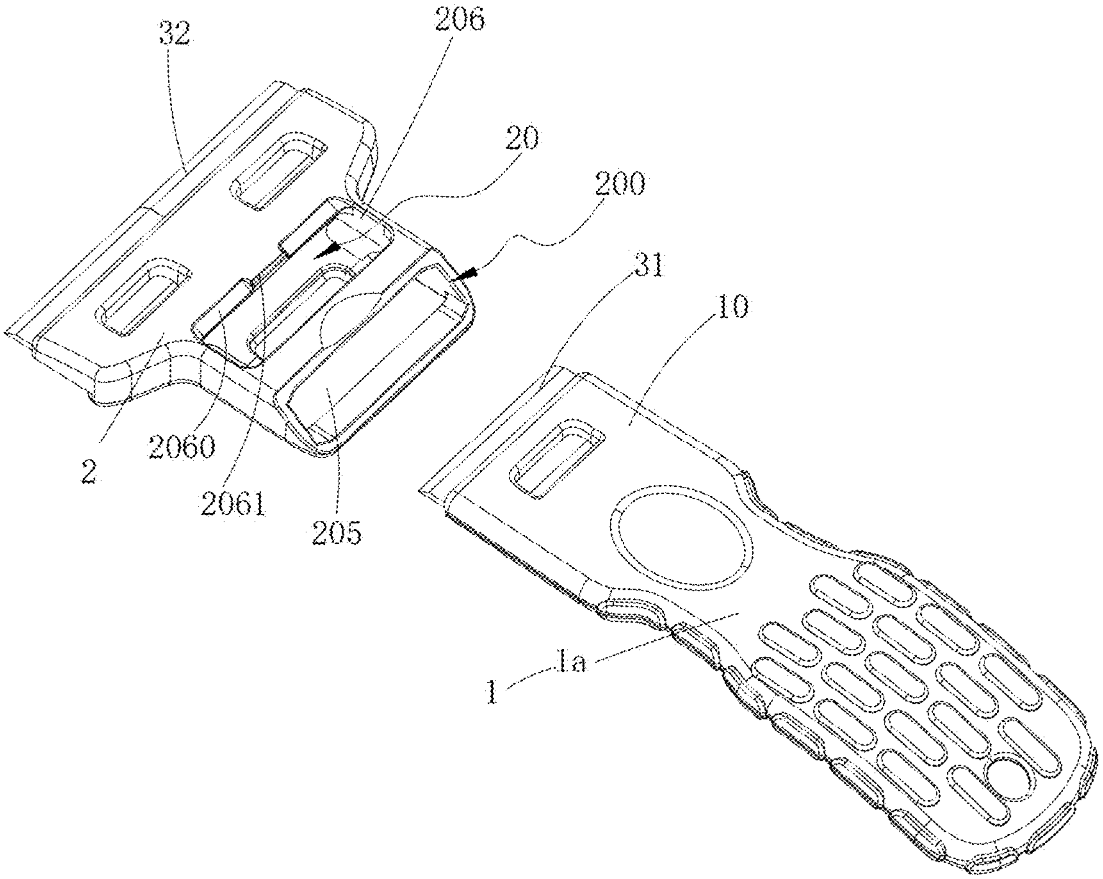
FIG. 2 is an exploded view of a scraper body and a scraper component in Embodiment I.
Figure 3:
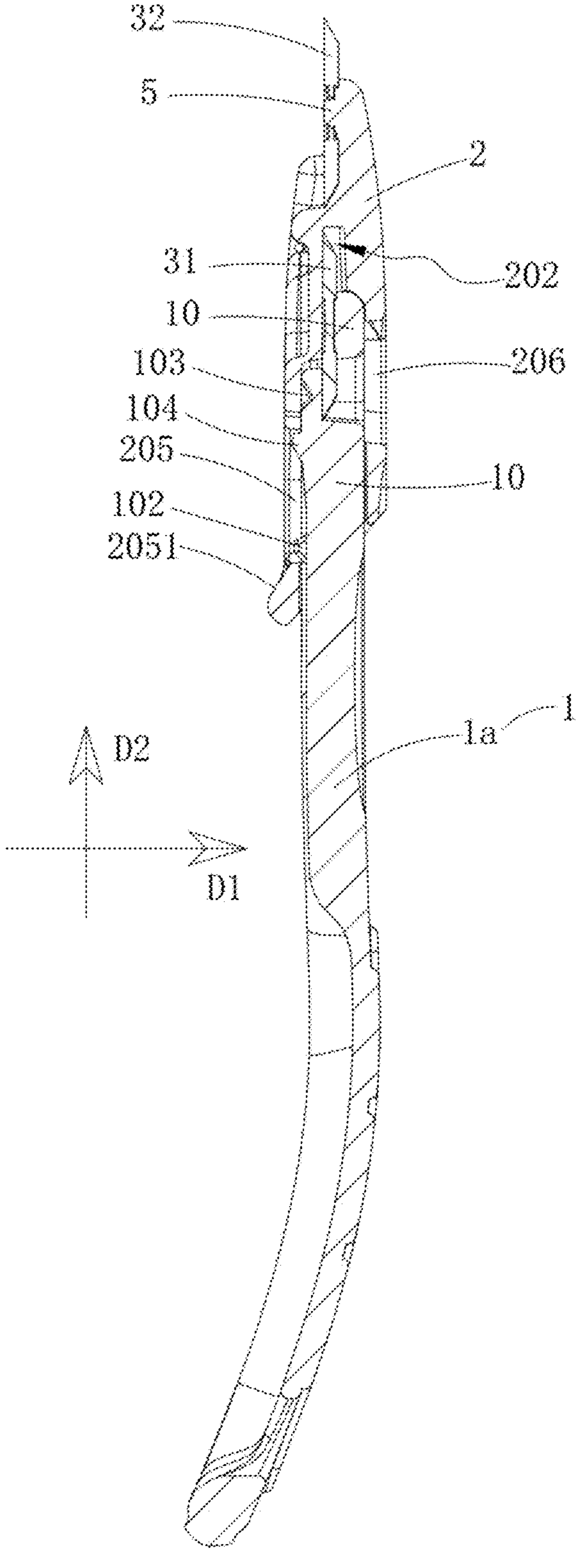
FIG. 3 is a cross-sectional view of the overall structure of the scraper in Embodiment I, showing the scraper in the first assembled state.

It should also be noted that the scraper body 1 may further include a handle 1*a* for the user to grip. In order to improve the user's gripping feel, the handle 1*a* can also be arranged as an arc-shaped strip structure as shown in FIG. 1, FIG. 2, and FIG. 3. Anti-slip protrusions can also be arranged on a surface of the handle 1*a* to increase stability when the user grips the handle 1*a*. In other embodiments, the width of the first blade 31 can also be greater than the width of the second blade 32. In this case, the scraper component 2 can be assembled to an end of the scraper body 1 away from the first blade 31, or a cavity which can accommodate a larger width of the first blade 31 can be defined in the scraper component 2 at an end of the scraper component 2 away from the second blade 32.

For convenience of explanation, according to the connection between the scraper body 1 and the scraper component 2, the scraper may be defined as having multiple states:

When the scraper is in an original working state, the scraper component 2 may be separated from the scraper body 1 or the scraper component 2 may be assembled with the scraper body 1. In this case, the first blade 31 can be in the usable state, and the user can use the first blade 31 for work by holding the scraper body 1.

When the scraper is in the first assembled state, the second assembled state, and the third assembled state, the scraper component 2 may be assembled on the scraper body 1 or the scraper component 2 may be exposed from the scraper body 1. In this case, the user can use the second blade 32 by holding the scraper body 1, or make the first blade 31 and the second blade 32 in a certain state where the first blade 31 and the second blade 32 can be used alternately, specifically as described in the third assembled state below.

Figure 24:
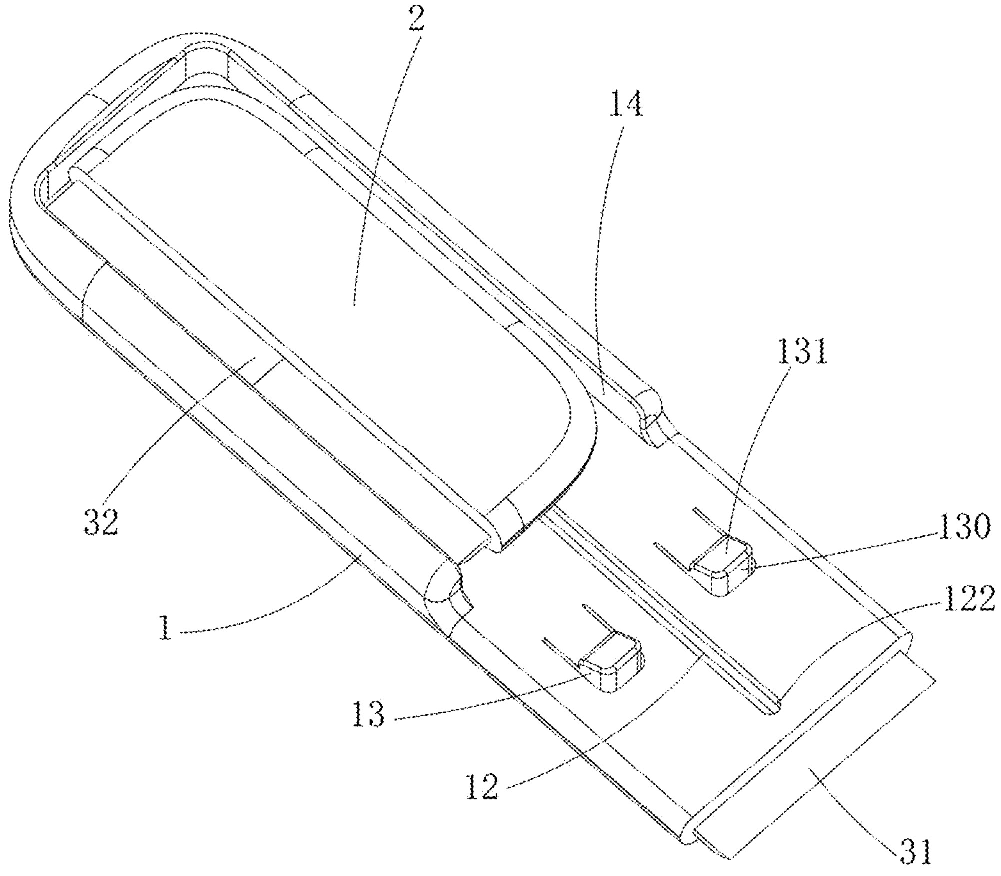
FIG. 24 is a schematic view of the overall structure of the scraper of Embodiment X, showing the scraper in the original working state.
Figure 27:
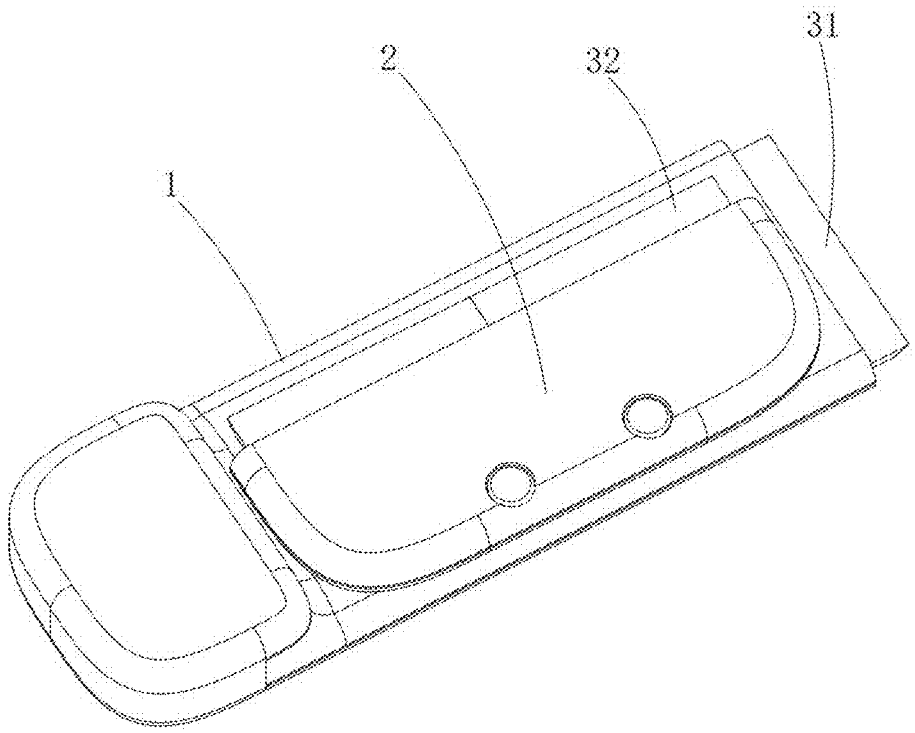
FIG. 27 is another schematic view of the overall structure of the scraper in Embodiment XI, showing the scraper in the original working state.

In some embodiments, when the scraper is in the original working state, the scraper component 2 may be detached from the scraper body 1 or received in a preset cavity of the scraper body 1. As shown in FIG. 2, when the scraper is in the original working state, the scraper component 2 may be completely detached from the scraper body 1. In this case, the scraper component 2 can be stored in the user's work backpack or other locations, and the first blade 31 fixed at an end of the scraper body 1 can be used for cleaning work by holding the scraper body 1. As shown in FIG. 24 and FIG. 27, when the scraper is in the original working state, the scraper component 2 can also be received in the preset cavity of the scraper body 1, specifically as described in the structures of Embodiment IX and Embodiment X, which will not be elaborated here.

In some embodiments, when the scraper is in the first assembled state, the scraper component 2 may be pivoted to the scraper body 1, and the scraper component 2 serves as an extension member of the scraper body 1. The first blade 31 may be received in the preset cavity of the scraper component 2, enabling each of the second blade 32 and a blade edge of the first blade 31 faces outward along an end of the scraper body 1. The first blade 31 and the second blade 32 facing in a same direction allow the user to avoid blade edges facing the user's hand when holding the scraper body 1 for use, which is convenient for the user to exert force and avoids injury to the user by the blade. In other embodiments, the scraper component 2 can also be connected to the end of the scraper body 1 away from the first blade 31. In this case, a length of the scraper body 1 can be set as long as possible to avoid interference to the user's hand by the first blade 31 and the second blade 32 at both ends of the scraper.

Figure 5:
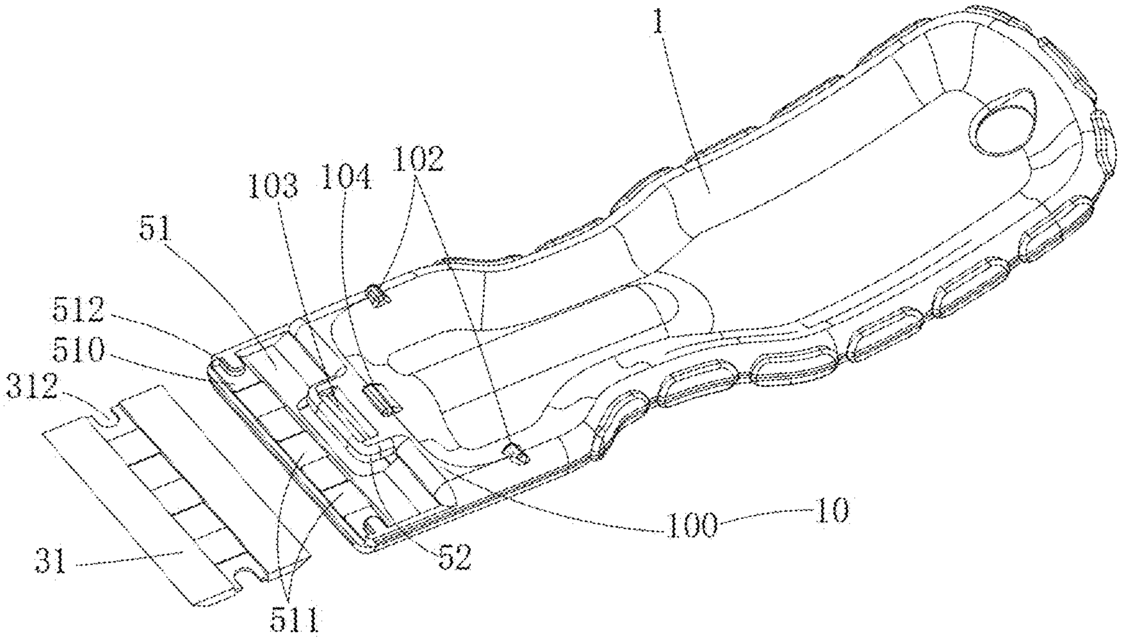
FIG. 5 is an exploded view of the scraper body and a first blade in Embodiment I.
Figure 8:
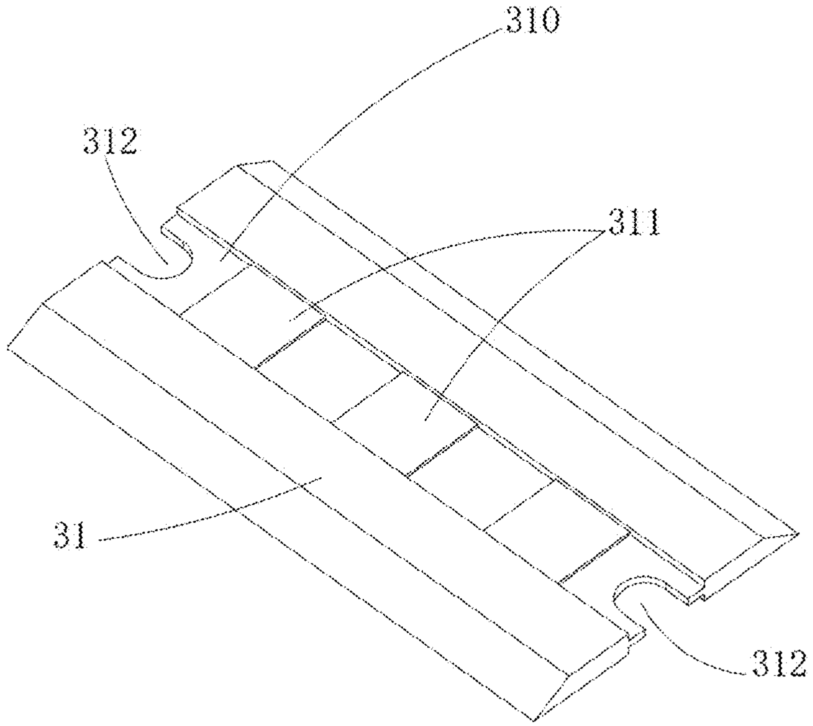
FIG. 8 is a structural view of the first blade of Embodiment I.

Referring to FIG. 5 and FIG. 8, in some embodiments, each of the scraper body 1 and the scraper component 2 may be arranged with a mounting member 5 for mounting the first blade 31 or the second blade 32. Each mounting member 5 includes a first mounting wall 51 and a second mounting wall 52 arranged facing the first mounting wall 51. The first blade 31 can be inserted between the first mounting wall 51 and the second mounting wall 52 of the scraper body 1, and the second blade 32 can be inserted between the first mounting wall 51 and the second mounting wall 52 of the scraper component 2. Specifically, an area of the first mounting wall 51 may be greater than an area of the second mounting wall 52. The first mounting wall 51 can be used for a large-area contact with the first blade 31 or the second blade 32 to improve the stability of the first blade 31 or the second blade 32 on the mounting member 5, and the large-area contact may be beneficial to improve a service life of the blade, and thus the first blade 31 or the second blade 32 may be not easy to break. The second mounting wall 52 with a smaller area can realize limiting the first blade 31 or the second blade 32 in a thickness direction, preventing the blade from detaching from the mounting member 5. In addition, the second mounting wall 52 with the smaller area can also facilitate the user to replace the blade on the mounting member 5. In order to further improve stability of the first blade 31 and the second blade 32 on a corresponding mounting member 5, in some embodiments, the first mounting wall 51 may be arranged with a first limiting snap strip 510. The first limiting snap strip 510 may define a plurality of first limiting snap recesses 511 distributed at intervals along a length direction of the first limiting snap strip 510. The first limiting snap strip 510 may be arranged with a first limiting snap protrusion 512 at each of two ends of the first limiting snap strip 510. Each of the first blade 31 and the second blade 32 may define a second limiting snap recess 310 matched with the first limiting snap strip 510, may be arranged with a plurality of second limiting snap protrusions 311 matched with the plurality of first limiting snap recesses 511, and may define two third limiting snap recesses 312 matched with the first limiting snap protrusions 512. The second limiting snap recess 310 may penetrate through the corresponding blade along a width direction of the corresponding blade, and each of the two third limiting snap recesses 312 may be defined at a respective one of two ends of the second limiting snap recess 310. An engagement between the first limiting snap strip 510 and the second limiting snap recess 310 can prevent the corresponding blade from detaching from the mounting member 5 along a pushing direction when the user pushes the corresponding blade for scraping. An engagement of the third limiting snap recesses 312 with the first limiting snap protrusions 512 and an engagement of the first limiting snap recesses 511 with the second limiting snap protrusions 311 can limit the corresponding blade in a width direction of the corresponding blade. In this way, through the engagement of a plurality of snap protrusions and snap grooves, multi-directional limitations on the width direction of the blade and a pushing direction of the scraper can be achieved, thereby improving the connection stability of each of the first blade 31 and the second blade 32 with a respective mounting member 5. In other embodiments, the first blade 31 and the second blade 32 can also be fixed to corresponding positions of the scraper body 1 and the scraper component 2 by threaded screw connections.

Referring to FIG. 2, FIG. 3, FIG. 5, FIG. 6, and FIG. 7, in some embodiments, the scraper body 1 may include a connecting end 10. The first blade 31 may be mounted on the connecting end 10. The scraper component 2 may define a connecting cavity 20 with an opening 200 communicated with the connecting cavity 20. The connecting end 10 can be inserted in the connecting cavity 20 through the opening 200. When the scraper is in the first assembled state, the connecting end 10 may be inserted in the connecting cavity 20, the first blade 31 may be received in the connecting cavity 20, and the first blade 31 may be in an unusable state. Specifically, the connecting end 10 may be arranged with the mounting member 5 for fixing the first blade 31. Thus, when the connecting end 10 is inserted in the connecting cavity 20, the first blade 31 can be received in the connecting cavity 20, which not only improves structural compactness of the scraper but also ensures that when the second blade 32 is working, the first blade 31 will not cause interference with the second blade 32 and can protect the first blade 31. In addition, each of the connecting cavity 20 and the second blade 32 may be formed at a respective one of two opposing ends of the scraper component 2, and when the connecting end 10 is inserted in the connecting cavity 20, the scraper component 2 may be an extension member of the scraper body 1. In this way, no matter whether the scraper is in the original working state or the first assembled state, the scraper body 1 can be held in a same gripping direction and gripping manner to operate the first blade 31 or the second blade 32 of the scraper for cleaning work, so as to maintain operational consistency and continuity of the scraper when in use.

Referring to FIG. 3, FIG. 6, FIG. 7, FIG. 10, and FIG. 14, in some embodiments, the scraper component 2 may include a bottom wall 203 and a top wall 204 which may cooperatively define the connecting cavity 20, and the bottom wall 203 and a top wall 204 may be arranged opposite each other. The connecting end 10 may have a bottom face 100 and a top face 101. When the scraper is in the first assembled state, the bottom face 100 may face the bottom wall 203, and the top face 101 may face the top wall 204. Specifically, the bottom wall 203 may abut against the bottom face 100, and the top wall 204 may abut against the top face 101. The face-contacting manner can improve stability of the connecting end 10 in the connecting cavity 20, avoiding significant shaking of the scraper component 2 during use.

Referring to FIG. 3, in some embodiments, a cavity wall for defining the connecting cavity 20 of the scraper component 2 may define a first limiting hole 205, and the connecting end 10 may be arranged with a connecting protrusion 102. When the scraper is in the first assembled state, the connecting protrusion 102 may be engaged in the first limiting hole 205. Specifically, the first limiting hole 205 can be formed in any cavity wall for defining the connecting cavity 20. In some embodiments, the first limiting hole 205 can be specifically formed in the bottom wall 203. Through the engagement of the connecting protrusion 102 with the first limiting hole 205, the connecting end 10 can be prevented from detaching from the connecting cavity 20 through the opening 200, and thus the connecting end 10 may be not easy to detach from the connecting cavity 20 through the opening 200 without forcibly pulling out the scraper body 1. It should also be noted that in other embodiments, the first limiting hole 205 can also be a recess formed in an inner wall for defining the connecting cavity 20, or can be defined in a protrusion strip formed on the inner wall for defining the connecting cavity 20.

Figure 7:
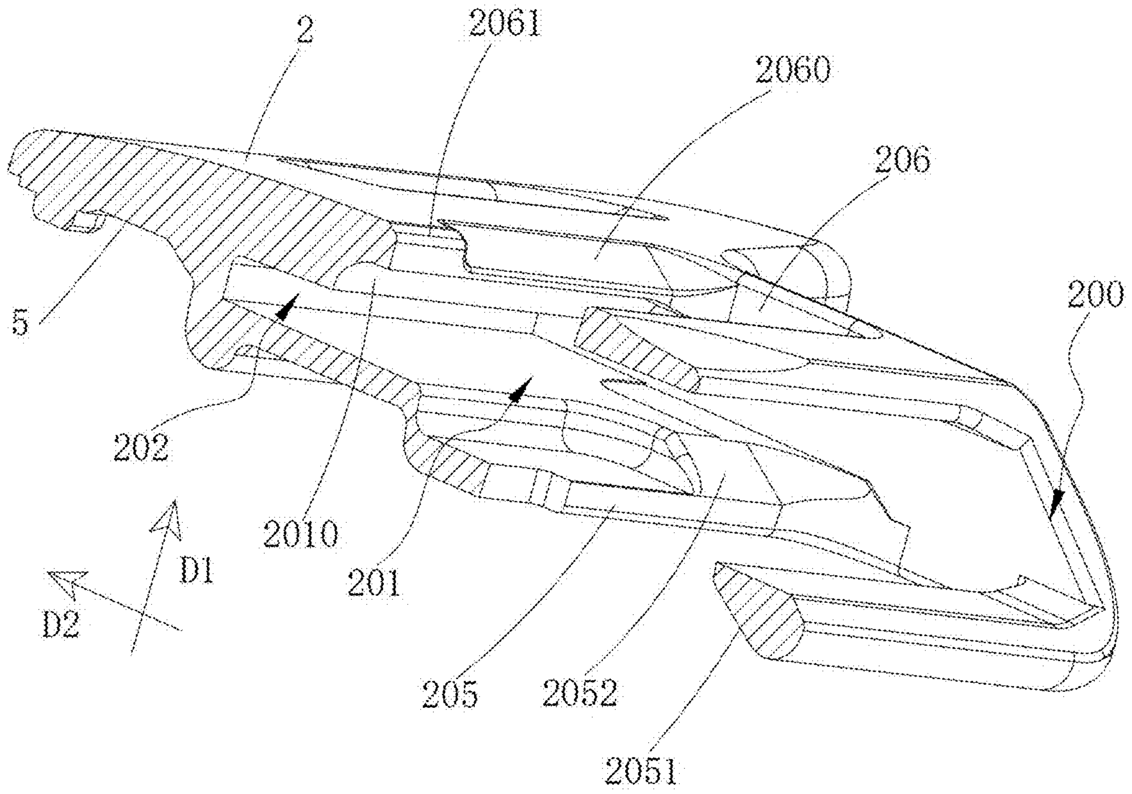
FIG. 7 is a stereoscopic cross-sectional view of the scraper component of Embodiment I and Embodiment II.

Referring to FIG. 7, in some embodiments, the connecting cavity 20 may include a connected first cavity 201 and a second cavity 202. The second cavity 202 may be located on a side of the first cavity 201 away from the opening 200. A thickness of the first cavity 201 may be greater than a thickness of the second cavity 202. An inner wall of the scraper component 2 for defining the first cavity 201 close to the second cavity 202 may be recessed to form a limiting face 2010 facing the opening 200. Specifically, length, width, and thickness dimensions of the first cavity 201 are approximately the same as those of the connecting end 10, respectively. In this way, after the connecting end 10 is inserted in the connecting cavity 20, an outer wall of the connecting end 10 may be engaged in the first cavity 201 in an interference fit manner to improve the connection stability between the connecting end 10 and the scraper component 2. In addition, when the scraper is in the first assembled state, the first blade 31 may be located in the second cavity 202, and an end wall of the connecting end 10 abuts against the limiting face 2010 to limit a movement of the connecting end 10 towards the second cavity 202. A depth of the second cavity 202 may be greater than a distance the first blade 31 extending beyond the connecting end 10, and a thickness of the second cavity 202 may be greater than a thickness of the first blade 31, enabling the first blade 31 to not abut against the inner wall of the scraper component 2 defining the second cavity 202, avoiding collision and breakage of the first blade 31 after the connecting end 10 is inserted in the connecting cavity 20. In addition, the limiting face 2010 may be an arc-shaped smooth face. When the connecting end 10 is inserted in the first cavity 201, the first blade 31 may abut against the limiting face 2010. The limiting face 2010 being arranged as an arc-shaped smooth face can help to guide the first blade 31 to the second cavity 202, avoiding damage to the first blade 31 by rough or flat faces.

Referring to FIGS. 9-14, in some embodiments, the scraper may also have a second assembled state and a third assembled state. Specifically, a top wall 204 for defining the connecting cavity 20 defines a second limiting hole 206. Each of the first limiting hole 205 and the second limiting hole 206 may be communicated with the connecting cavity 20. A minimum distance between the second limiting hole 206 and the second blade 32 may be not equal to a minimum distance between the first limiting hole 205 and the second blade 32. Specifically, a thickness direction of the connecting cavity 20 may be defined as a first direction D1 as shown in FIG. 3 and FIG. 7, and a direction perpendicular to the first direction D1 and extending from the second blade 32 to the opening 200 of the connecting cavity 20 may be defined as a second direction D2 as shown in FIG. 3 and FIG. 7. The bottom wall 203 and the top wall 204 may be spaced apart from and opposite each other in the first direction D1, and the first limiting hole 205 and the second limiting hole 206 are staggered in the second direction D2. Specifically, the minimum distance between the first limiting hole 205 and the second blade 32 may be greater than the minimum distance between the second limiting hole 206 and the second blade 32. Thus, when the connecting end 10 penetrates through the scraper component 2 from the first limiting hole 205 towards the second limiting hole 206, an orientation of a blade edge of the first blade 31 and an orientation of a blade edge of the second blade 32 may be coincide with each other. When the scraper is in the second assembled state, the connecting end 10 may pass through the first limiting hole 205, the connecting cavity 20, and the second limiting hole 206, the bottom face 100 of the connecting end 10 may face the scraper component 2, the second blade 32 may be in the usable state, and the second blade 32 may form a first included angle α with the bottom face 100. When the scraper is in the third assembled state, the connecting end 10 may pass through the first limiting hole 205, the connecting cavity 20, and the second limiting hole 206, the top face 101 of the connecting end 10 may face the scraper component 2, both the first blade 31 and the second blade 32 can be in the usable state, and the second blade 32 may form a second included angle β with the top face 101. In addition, an angle of the second included angle β may be greater than an angle of the first included angle α. In summary, the second assembled state and the third assembled state of the scraper may be different from the aforementioned first assembled state. In the first assembled state of the scraper, the scraper component 2 may serve as the extension member of the scraper body 1, and there may be no included angle between the second blade 32 and the scraper body 1, while both in the second assembled state and the third assembled state, there may be an included angle between the second blade 32 and the scraper body 1, and the included angle between the second blade 32 and the scraper body 1 in the second assembled state may be different from the included angle between the second blade 32 and the scraper body 1 in the third assembled state, allowing the scraper to be suitable for cleaning working faces at different inclinations. Users can switch the working states of the scraper as needed to meet diversified working needs and improve user experience.

It should also be noted that the mounting member 5 of the scraper body 1 may be specifically arranged on the bottom face 100 of the connecting end 10. In other words, the first mounting wall 51 may be a member formed on the bottom face 100 of the connecting end 10, making the bottom face 100 of the connecting end 10 a main force-bearing face for the first blade 31. When the scraper is in the second assembled state, since the bottom face 100 faces the scraper component 2, the first blade 31 may be closer to the surface of the scraper component 2, making it inconvenient for the first blade 31 to work in this state. Conversely, when the scraper is in the third assembled state, the top face 101 faces the scraper component 2, i.e., the bottom face 100 faces away from the scraper component 2. In this case, the first blade 31 can be used in a posture shown in FIG. 13, and a force condition of the first blade 31 in this case may be approximately the same as that in the original working state.

Figure 10:
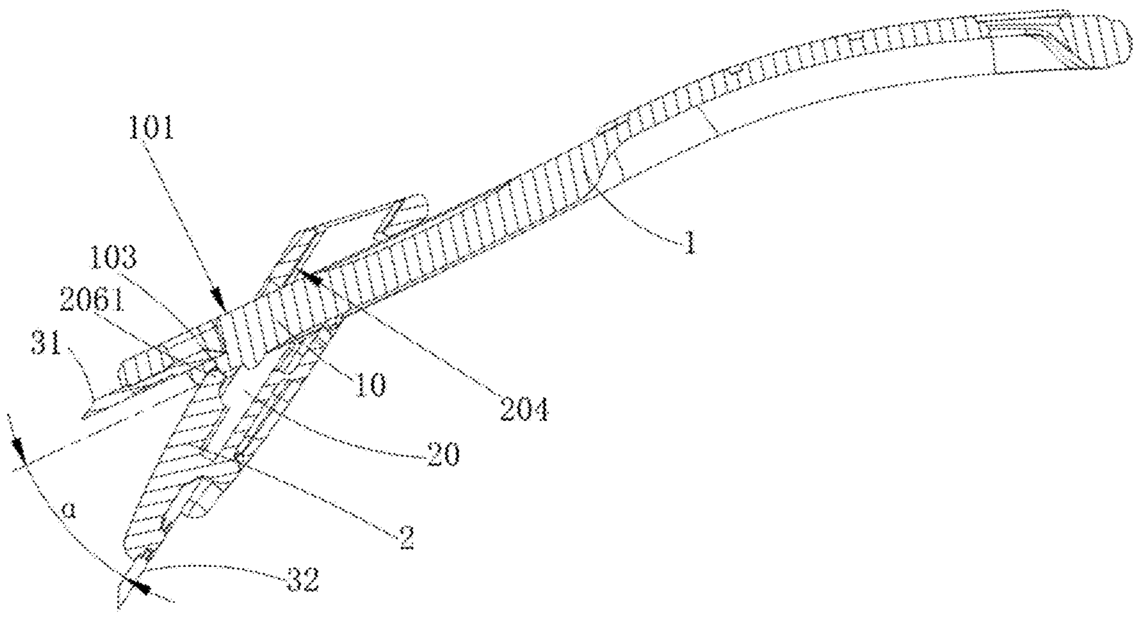
FIG. 10 is another cross-sectional view of the overall structure of the scraper in Embodiment I, showing the scraper in a second assembled state.
Figure 14:
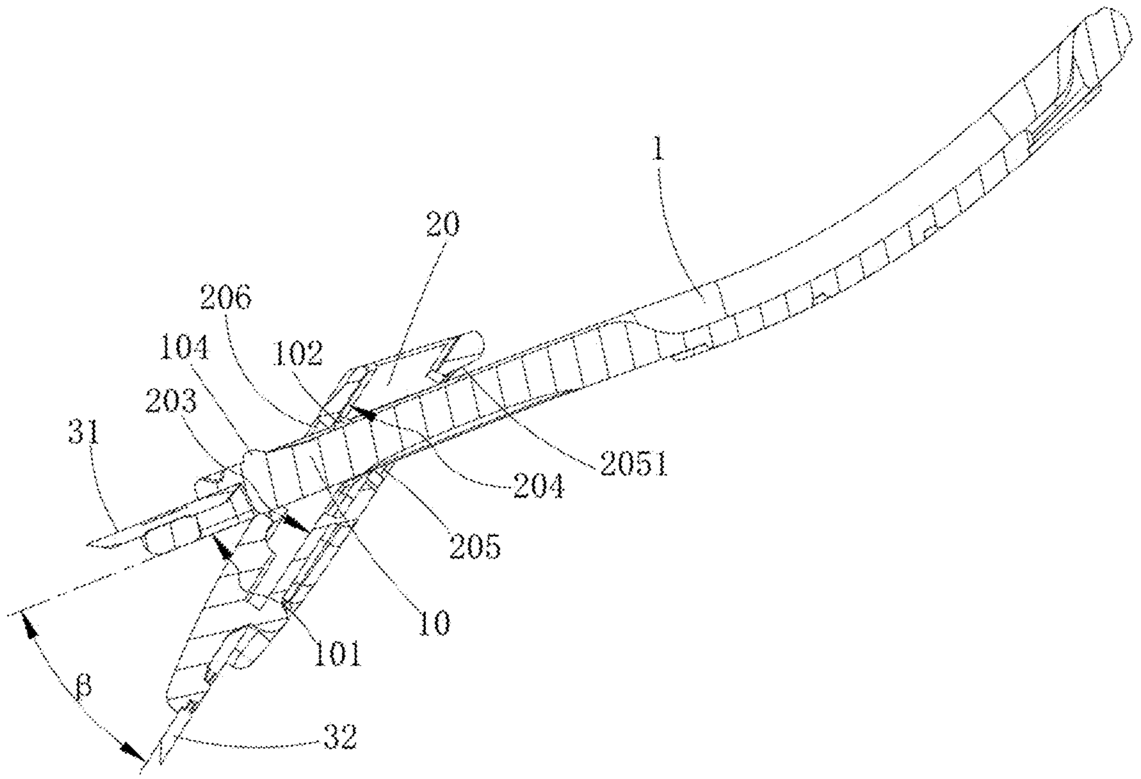
FIG. 14 is further another cross-sectional view of the overall structure of the scraper of Embodiment I, showing the scraper in the third assembled state.

Referring to FIG. 7, FIG. 10, and FIG. 14, in some embodiments, the scraper component 2 may include a first inclined wall 2051 and a second inclined wall 2052. The first inclined wall 2051 and the second inclined wall 2052 are arranged opposite each other and can define the first limiting hole 205. The scraper component 2 may include a third inclined wall 2060 for forming the second limiting hole 206, and the third inclined wall 2060 may be coplanar with the second inclined wall 2052. When the scraper is in the second assembled state, the bottom face 100 of the connecting end 10 may abut against the second inclined wall 2052 and the third inclined wall 2060, and the top face 101 of the connecting end 10 may abut against the first inclined wall 2051. When in the third assembled state, the bottom face 100 of the connecting end 10 may abut against the first inclined wall 2051, and the top face 101 of the connecting end 10 may abut against the second inclined wall 2052 and the third inclined wall 2060.

Specifically, each of the first inclined wall 2051, the second inclined wall 2052, and the third inclined wall 2060 may incline towards the second blade 32. In this way, when the connecting end 10 passes through the first limiting hole 205 and the second limiting hole 206, the blade edges of the second blade 32 and the first blade 31 may approximately face in a same direction, allowing the user to use the scraper in the second assembled state and the third assembled state in a same way as pushing the scraper in the original working state, maintaining a consistency of use of the scraper. In addition, the staggered first limiting hole 205 and the second limiting hole 206 can improve stability of the connecting end 10 passing through the first limiting hole 205 and the second limiting hole 206. In this way, both the top face 101 and the bottom face 100 of the connecting end 10 may be subjected to a pressing force from the scraper component 2. The arrangement of the first inclined wall 2051, the second inclined wall 2052, and the third inclined wall 2060 can further increase a contact area between the connecting end 10 and the scraper component 2, thereby improving overall structural stability when the scraper is in the second assembled state and the third assembled state.

Figure 11:
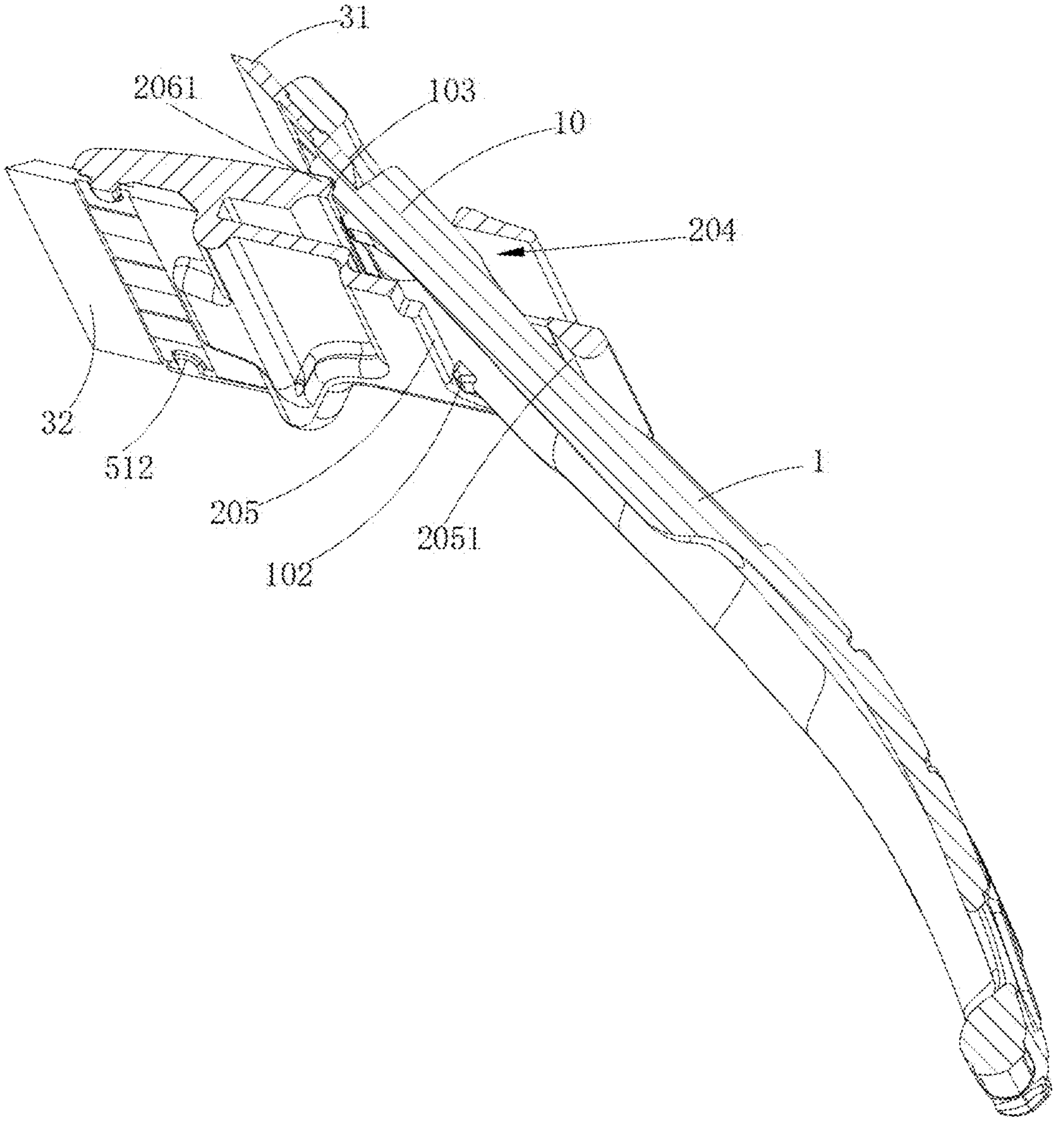
FIG. 11 is a stereoscopic cross-sectional view of the scraper in Embodiment I, showing the scraper in a second assembled state.

Referring to FIG. 10 and FIG. 11, in some embodiments, the bottom face 100 of the connecting end 10 may define a first engaging recess 103, and the third inclined wall 2060 may be arranged with a limiting protrusion 2061 configured to be engaged in the first engaging recess 103. Through the engagement of the first engaging recess 103 with the limiting protrusion 2061, the scraper can be maintained in the second assembled state. During use, by inserting the connecting end 10 along a direction from the first limiting hole 205 to the second limiting hole 206, the limiting protrusion 2061 may be engaged in the first engaging recess 103, and thus the connecting end 10 cannot continue to move along the insertion direction. When the user holds the scraper body 1 to push the scraper, the connecting end 10 may be restricted by the staggered first limiting hole 205 and the second limiting hole 206, and the engagement of the first engaging recess 103 with the limiting protrusion 2061, stably remaining the scraper in the second assembled state, preventing the scraper component 2 from detaching from the scraper body 1 during use.

Figure 12:
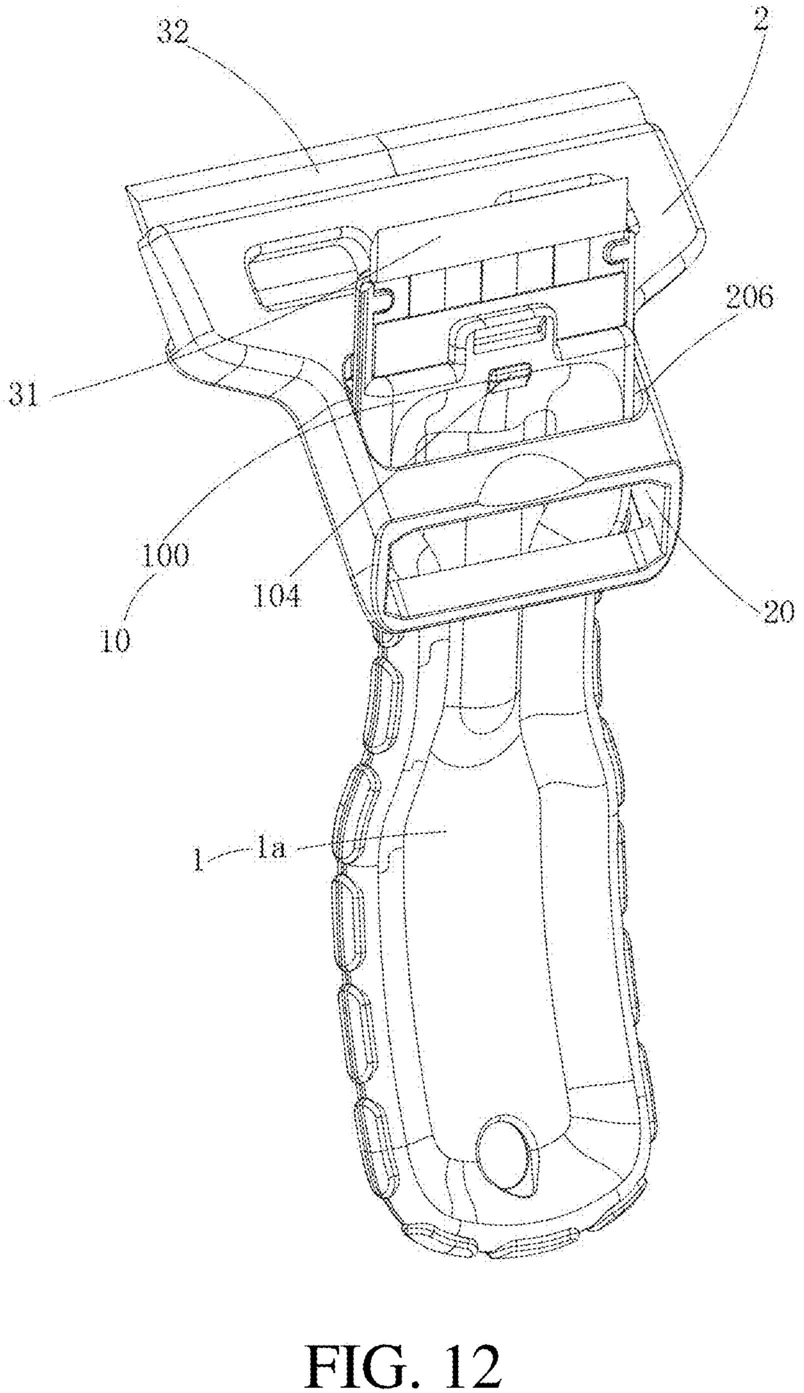
FIG. 12 is further another schematic view of the overall structure of the scraper of Embodiment I, showing the scraper in a third assembled state.

Referring to FIG. 12 and FIG. 14, in some embodiments, when the scraper is in the third assembled state, the connecting protrusion 102 may be arranged in the connecting cavity 20, and the connecting protrusion 102 may abut against the top wall 204 to prevent the connecting end 10 from disengaging from the scraper component 2 through the second limiting hole 206. Since the bottom face 100 of the connecting end 10 is arranged with the connecting protrusion 102, in addition to be engaged in the first limiting hole 205, the connecting protrusion 102 can also be used to maintain the third assembled state of the scraper, making the structure of the scraper highly reusable. Specifically, when the connecting end 10 is inserted from the first limiting hole 205 towards the second limiting hole 206, after the first blade 31 passes through the second limiting hole 206, the connecting protrusion 102 can abut against the top wall 204 for defining the connecting cavity 20, thereby limiting the connecting end 10 from continuing to move along the insertion direction, ensuring that when the user holds the scraper body 1 to push, the scraper component 2 will not detach from the scraper body 1, and the second blade 32 can be stably used for cleaning work.

Referring to FIG. 14, in some embodiments, the bottom face 100 of the connecting end 10 may be arranged with an abutting protrusion 104. When the scraper is in the third assembled state, the abutting protrusion 104 may be located out of the connecting cavity 20, and the abutting protrusion 104 may abut against an inner wall of the scraper component 2 for defining the second limiting hole 206 to prevent the connecting end 10 from disengaging from the scraper component 2 through the second limiting hole 206. Specifically, the abutting protrusion 104 and the connecting protrusion 102 may be spaced apart from each other in a length direction of the connecting end 10. In this way, when the scraper is in the third assembled state, the abutting protrusion 104 may be located out of the connecting cavity 20 and may abut against a hole wall of the scraper component 2 for defining the second limiting hole 206, and the connecting protrusion 102 may be located in the connecting cavity 20 and may abut against the top wall 204, forming internal and external abutting limits, thereby stably maintaining the scraper in the third assembled state.

Figure 28:
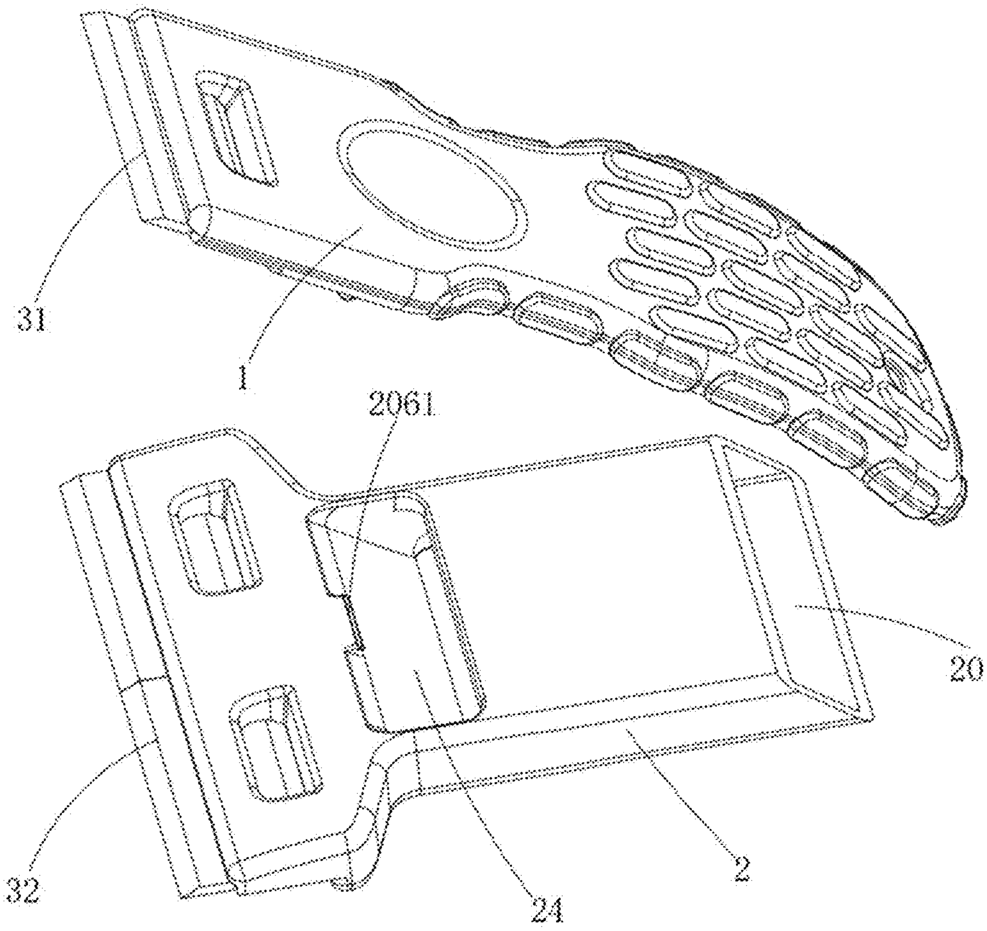
FIG. 28 is an exploded view of the scraper body and the scraper component according to some embodiments of the present disclosure, showing an inclined hole in the scraper component.
Figure 29:
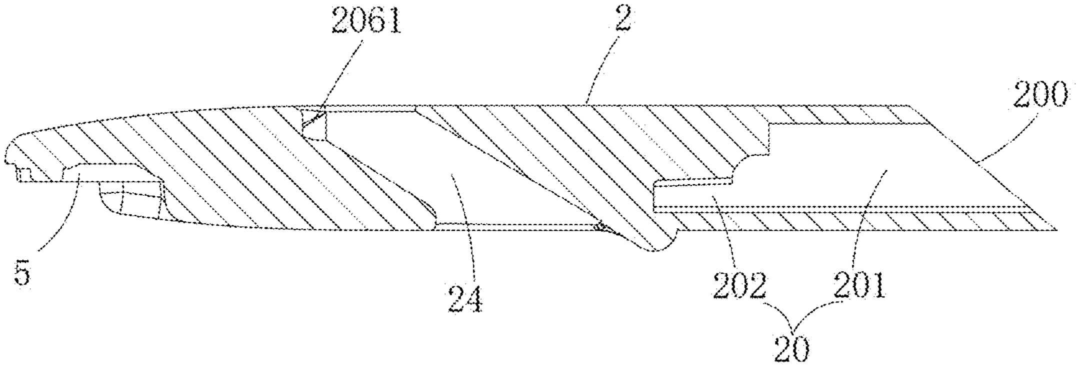
FIG. 29 is a cross-sectional view of the scraper component according to some embodiments of the present disclosure, showing the inclined hole and the connecting cavity.

It should also be noted that in some embodiments, as shown in FIGS. 28-29, the scraper component 2 may define an inclined hole 24 penetrating through the scraper component 2, and the inclined hole 24 may be not communicated with the connecting cavity 20, i.e., may be isolated from the connecting cavity 20. When the connecting end 10 passes through the inclined hole 24, the first blade 31 and/or the second blade 32 are in the usable state. Specifically, the inclined hole may be approximately the same as the structure formed by the aforementioned first limiting hole 205 and second limiting hole 206, except that the inclined hole 24 may be not communicated with the connecting cavity 20. The inclined hole 24 may pass through the scraper component 2 along a thickness direction of the scraper component 2, or along a direction oblique to the thickness direction of the scraper component 2. For convenience of understanding, one end opening of the inclined hole 24 can be regarded as the first limiting hole 205, and the other end opening can be regarded as the second limiting hole 206. A hole wall of the scraper component 2 defining the inclined hole 24 can be arranged with protrusions or define grooves that can be engaged with the connecting end 10.

Figure 15:
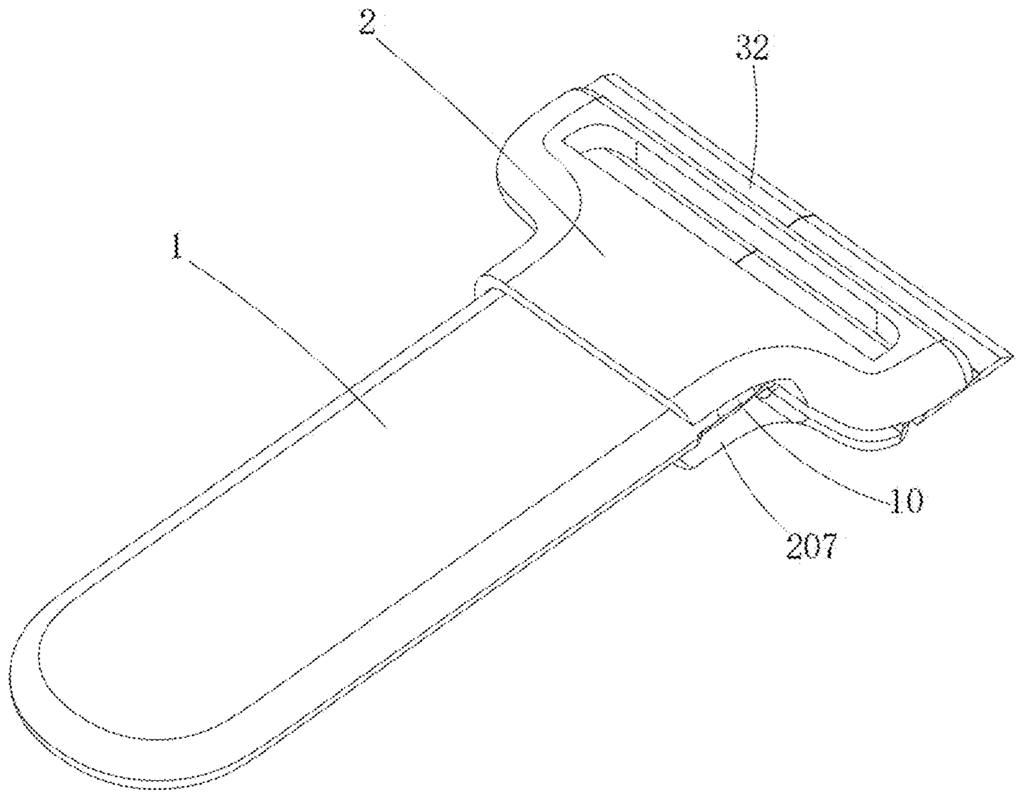
FIG. 15 is a schematic view of the overall structure of the scraper according to Embodiment III of the present disclosure.

Referring to FIG. 15, in some embodiments, the connecting cavity 20 may have an opening 200 which may be longitudinally defined and a side opening 207 which may be laterally defined. The side opening 207 may be located between the opening 200 and the second blade 32. The side opening 207 penetrates through a side wall for defining the connecting cavity 20. The connecting end 10 can be inserted in the connecting cavity 20 through the side opening 207, and can be engaged in the connecting cavity 20. Through the side opening 207 and the opening 200, the connecting end 10 can be inserted in the connecting cavity 20 along a width direction of the scraper component 2. The side opening 207 can allow the connecting end 10 to be inserted in the connecting cavity 20 of the scraper component 2 and detached from the connecting cavity 20 more quickly. In this way, the original working state and the first assembled state of the scraper can be switched faster.

Figure 16:
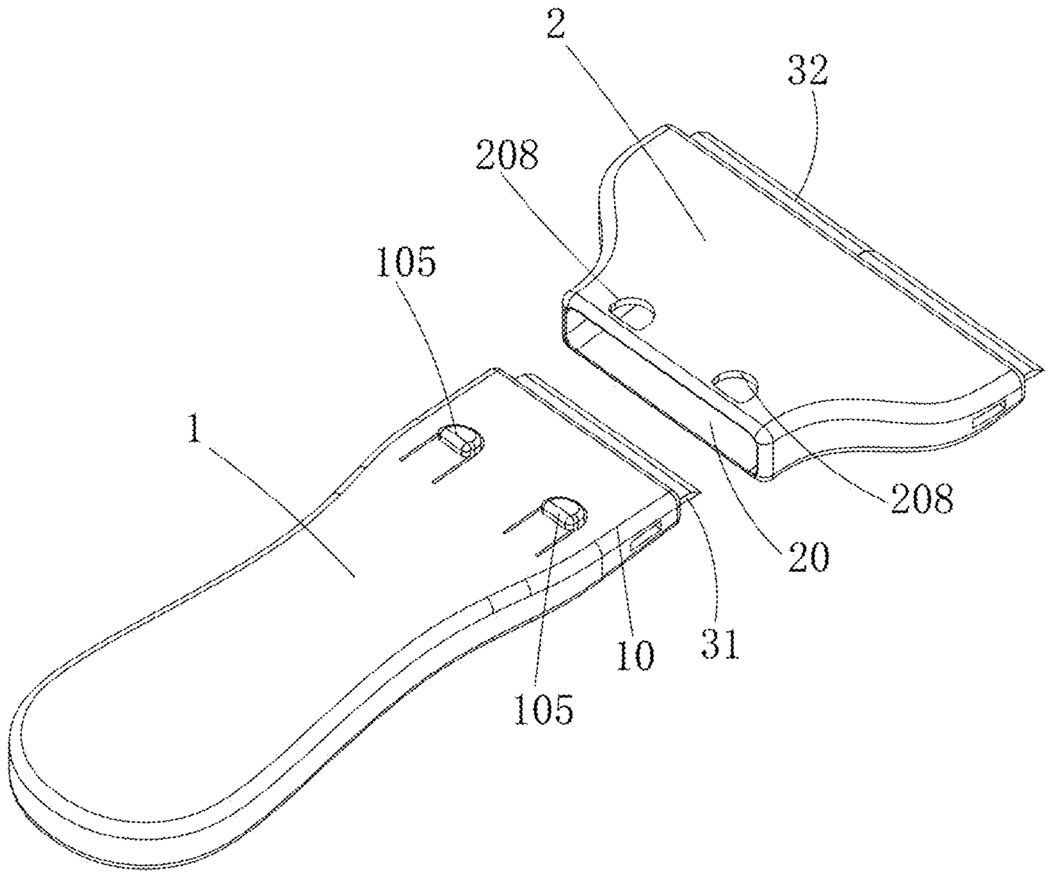
FIG. 16 is an exploded view of the scraper body and the scraper component according to Embodiment IV of the present disclosure.
Figure 17:
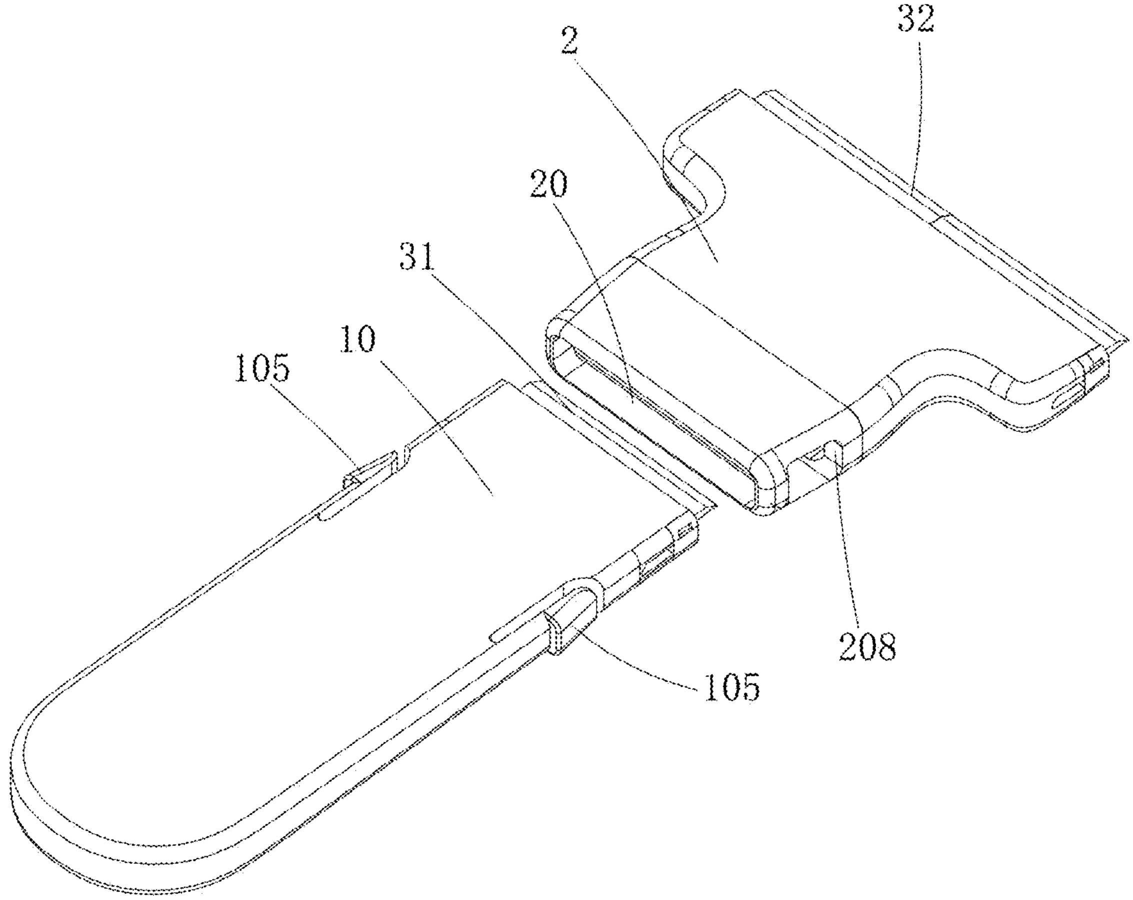
FIG. 17 is an exploded view of the scraper body and the scraper component according to Embodiment V of the present disclosure.

Referring to FIG. 16 and FIG. 17, in some embodiments, the connecting end 10 may be arranged with at least two elastic snapping fasteners 105, and the inner wall for defining the connecting cavity 20 may define at least two fastening through-holes 208. The at least two elastic snapping fasteners 105 may be engaged in the at least two fastening through-holes 208 in a one-to-one correspondence in a snap-fit manner to maintain the scraper in the first assembled state. Specifically, the elastic snapping fastener 105 may be composed of an elastic piece arranged on any outer wall of the connecting end 10 and a protrusion on the elastic piece. When the connecting end 10 is inserted in the connecting cavity 20, the elastic snapping fastener 105 undergoes elastic deformation due to squeezing of the cavity wall for defining the connecting cavity 20. When the elastic snapping fastener 105 is inserted in the fastening through-hole 208, the elastic snapping fastener 105 may be naturally engaged in the fastening through-hole 208 in a snap-fit manner, enabling the scraper to be in the first assembled state. Conversely, by pressing a part of the elastic snapping fastener 105 exposed through the fastening through-hole 208, the elastic snapping fastener 105 can be disengaged from the fastening through-hole 208, and then the connecting end 10 can be pulled out of the connecting cavity 20, enabling the scraper to be in the original working state.

It should also be noted that the two elastic snapping fasteners 105 can be formed on a same outer wall of the connecting end 10 and spaced apart from each other, as shown in FIG. 16. Specifically, the two elastic snapping fasteners 105 can be distributed on the top face 101 of the connecting end 10, and corresponding fastening through-holes 208 can be defined in the top wall 204 for defining the connecting cavity 20. Alternatively, each of the two elastic snapping fasteners 105 may be formed on a respective one of two opposing outer walls of the connecting end 10, as shown in FIG. 17. Specifically, the elastic snapping fasteners 105 are arranged on two side walls of the connecting end 10 in a width direction of the connecting end 10, thereby facilitating the user to press the elastic snapping fasteners 105 on both sides with one hand to release the snap-fit engagement between the elastic snapping fasteners 105 and the fastening through-holes 208.

Figure 19:
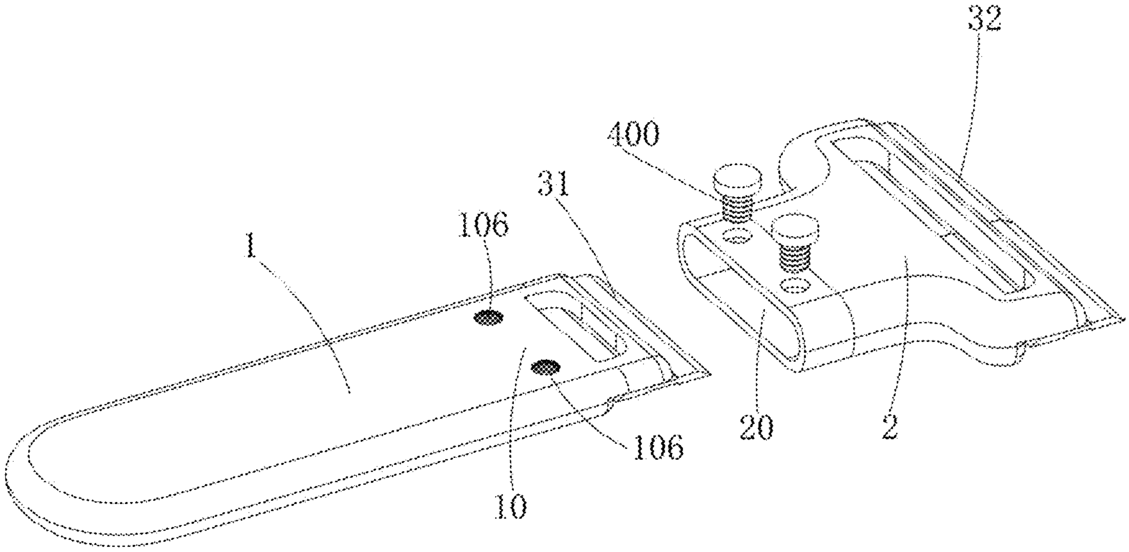
FIG. 19 is an exploded view of the scraper body and the scraper component according to Embodiment VII of the present disclosure.

Referring to FIG. 19, in some embodiments, the scraper may further include a limiting bolt 400. The connecting end 10 may define a limiting screw hole 106. The limiting bolt 400 may penetrate through the cavity wall for defining the connecting cavity 20 and may be then threadedly engaged in the limiting screw hole 106 to maintain the scraper in the first assembled state. The limiting bolt 400 may be specifically two or more. Corresponding through-holes may be defined in the scraper component 2 corresponding to limiting screw holes 106. After the connecting end 10 is inserted in the connecting cavity 20, the limiting bolt 400 can pass through the corresponding through-hole and be threadedly engaged the limiting screw hole 106 to maintain the scraper in the first assembled state.

Figure 18:
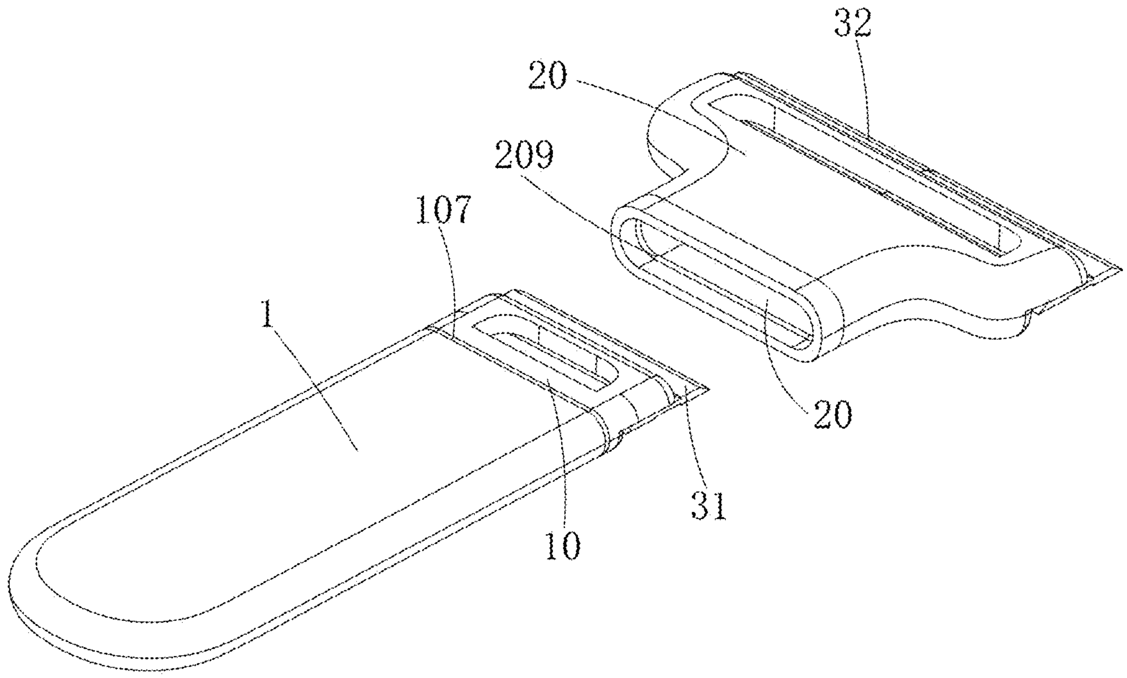
FIG. 18 is an exploded view of the scraper body and the scraper component according to Embodiment VI of the present disclosure.

Referring to FIG. 18, in some embodiments, the outer wall of the connecting end 10 defines an annular groove 107, and the inner wall for defining the connecting cavity 20 may be arranged with an annular protrusion 209 which can be snapped in the annular groove 107. When the scraper is in the first assembled state, the annular protrusion 209 may be engaged in the annular groove 107. The engagement of the annular protrusion 209 with the annular groove 107 can provide a uniform force on the connecting end 10 and the scraper component 2 in a circumferential direction, making the connection between the connecting end 10 and the scraper component 2 more stable. It should also be noted that the annular groove 107 can also be defined the inner wall for defining the connecting cavity 20, and the annular protrusion 209 can be formed on the outer wall of the connecting end 10, enabling the connecting end 10 to be snapped in the connecting cavity 20.

Figure 20:
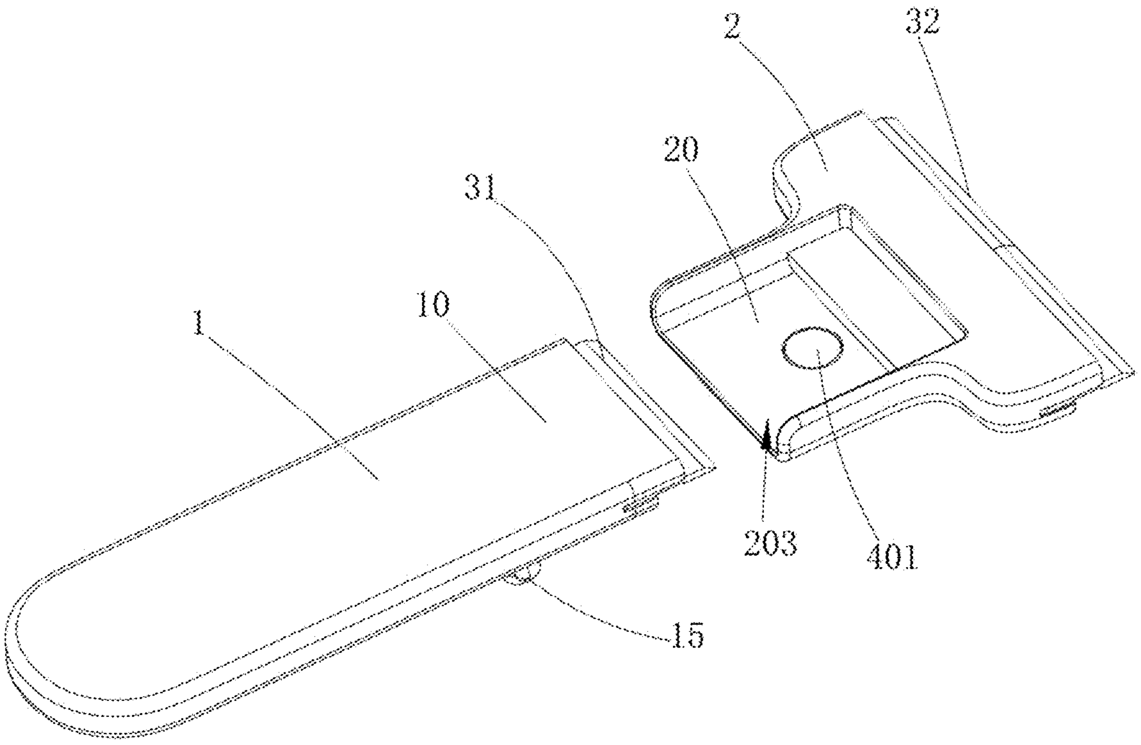
FIG. 20 is an exploded view of the scraper body and the scraper component according to Embodiment VIII of the present disclosure.
Figure 21:
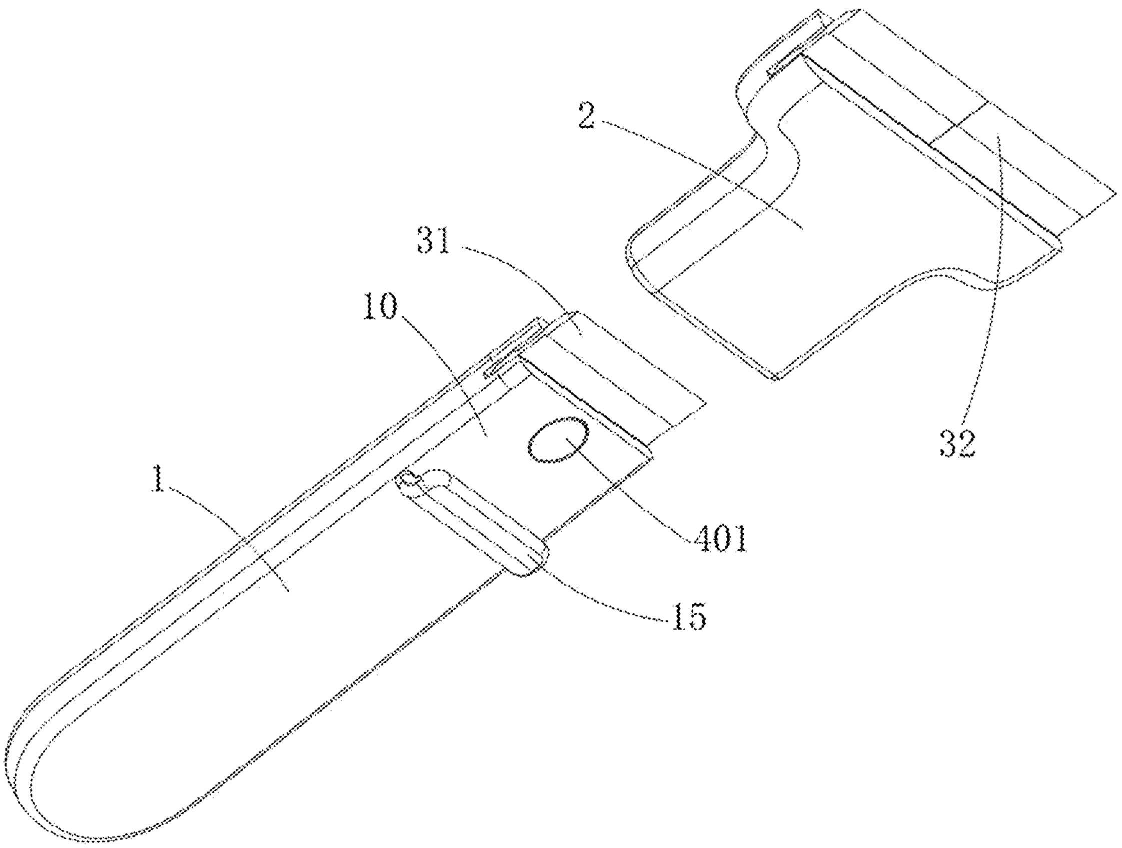
FIG. 21 is another exploded view of the scraper body and the scraper component of Embodiment VIII.

Referring to FIG. 20 and FIG. 21, in some embodiments, the scraper may further include at least two magnetic members 401. For example, the number of the at least two magnetic members 401 is two. One of the two magnetic members 401 may be fixed to the connecting end 10, and the other of the two magnetic members 401 may be fixed to the cavity wall for defining the connecting cavity 20. When the scraper is in the first assembled state, the two magnetic members 401 may be magnetically attracted to each other. Specifically, for convenience of mounting, the top wall 204 for defining the connecting cavity 20 can be removed, and thus the connecting cavity 20 becomes a more open cavity, and one magnetic member 401 may be mounted to the bottom wall 203 for defining the connecting cavity 20, and the other magnetic member 401 may be mounted to the bottom face 100 of the connecting end 10. Through the magnetic attraction of the two magnetic members 401, the scraper component 2 may not be easy to detach from the scraper body 1 in the thickness direction of the scraper component 2. In addition, the bottom face 100 of the connecting end 10 may be arranged with an L-shaped hook 15. When the scraper is in the first assembled state, the L-shaped hook 15 may hook the bottom wall 203 for defining the connecting cavity 20, further improving the connection stability of the scraper component 2 with the scraper body 1 in the thickness direction of the scraper component 2.

Figure 22:
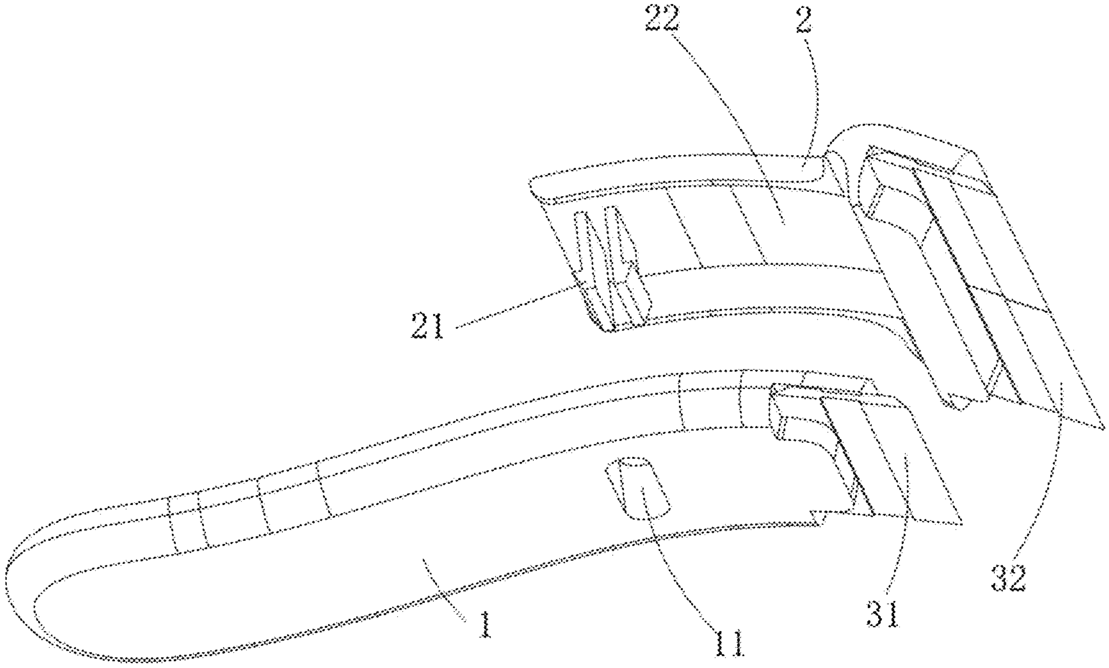
FIG. 22 is an exploded view of the scraper body and the scraper component according to Embodiment IX of the present disclosure.

Referring to FIG. 22, in some embodiments, the scraper body 1 may define an insertion hole 11, and the scraper component 2 may include an insertion fastener 21 and define a first accommodating recess 22. An end of the scraper body 1 where the first blade 31 is mounted can be accommodated in the first accommodating recess 22, and the insertion fastener 21 can be snapped in the insertion hole 11 to maintain the scraper in the first assembled state. Specifically, a shape of the first accommodating recess 22 may be approximately the same as a shape of the end of the scraper body 1 where the first blade 31 is mounted. Since the scraper component 2 sleeves the end of the scraper body 1 via the first accommodating recess 22, the scraper component 2 may be limited in a width direction of the scraper component 2. The insertion fastener 21 may be specifically U-shaped. By pinching hooks of the insertion fastener 21 from both sides, a spacing of the hooks can be changed, enabling the insertion fastener 21 to be detached from or inserted in the insertion hole 11. The connection manner of the insertion fastener 21 and the insertion hole 11 may refer to a principle of a male-female buckle. During a process of sleeving the end of the scraper body 1 and the first blade 31, the insertion fastener 21 may also need to be aligned with the insertion hole 11 for insertion. The snap-fit engagement of the insertion fastener 21 with the insertion hole 11 can limit the scraper component 2 and the scraper body 1 in the pushing direction, thereby improving the connection stability of the scraper component 2 and the scraper body 1. When it is necessary to switch to the original working state, by pinching the hooks of the insertion fastener 21, the insertion fastener 21 can be disengaged from the insertion hole 11, and then the scraper component 2 can be removed from the scraper body 1.

Referring to FIG. 23, FIG. 24, FIG. 25, FIG. 26, and FIG. 27, in some embodiments, the scraper body 1 may define a guide hole 12, and the scraper component 2 may include a guide post 23. The guide hole 12 may extend along a length direction of the scraper body 1. The guide hole 12 may have a first end 121 and a second end 122 away from the first end 121, and the first end 121 may be located away from the first blade 31. The guide post 23 can slide along a length direction of the guide hole 12, and the guide post 23 can rotate relative to the scraper body 1 through the guide hole 12. Specifically, the guide post 23 may be a T-shaped post member, and the guide hole 12 may be a stepped hole matched with the guide post 23, thereby preventing the guide post 23 from detaching from the guide hole 12 along an axial direction of the guide post 23 after the guide post 23 is assembled in the guide hole 12. When the scraper is in the original working state, that is, when the first blade 31 is in the usable state, the guide post 23 may be positioned at the first end 121 of the guide hole 12, and the scraper component 2 and the second blade 32 may be assembled with the scraper body 1. When the scraper is in the first assembled state, that is, when the second blade 32 is in the usable state, the guide post 23 may be positioned at the second end 122 of the guide hole 12, and the scraper component 2 and the second blade 32 may extend out from the scraper body 1.

Through the movable engagement between the guide post 23 and the guide hole 12, the scraper component 2 can slide along the length direction of the guide hole 12 and can rotate relative to the scraper body 1. For example, when the guide post 23 is positioned at the second end 122 of the guide hole 12, a width direction of the second blade 32 may be approximately perpendicular to the length direction of the scraper body 1, enabling the blade edge of the second blade 32 to extend along the length direction of the scraper body 1 when the user holds the scraper body 1, and in this way, the second blade 32 can be used for work. Conversely, since a length of the scraper body 1 is greater than a width of the scraper component 2, and a width of the scraper body 1 is greater than a length of the scraper component 2, when the second blade 32 is not needed, and when the guide post 23 is located at the second end 122 or slides from the second end 122 towards the first end 121, rotating the scraper component 2 to enable a width direction of the scraper component 2 to be approximately parallel to the length direction of the scraper body 1, then pushing the guide post 23 to the first end 121 of the guide hole 12, thereby enabling the scraper component 2 to be assembled with the scraper body 1, and preventing scraper component 2 and the second blade 32 from extending out from the scraper body 1 along the length direction of the scraper body 1.

Figure 23:
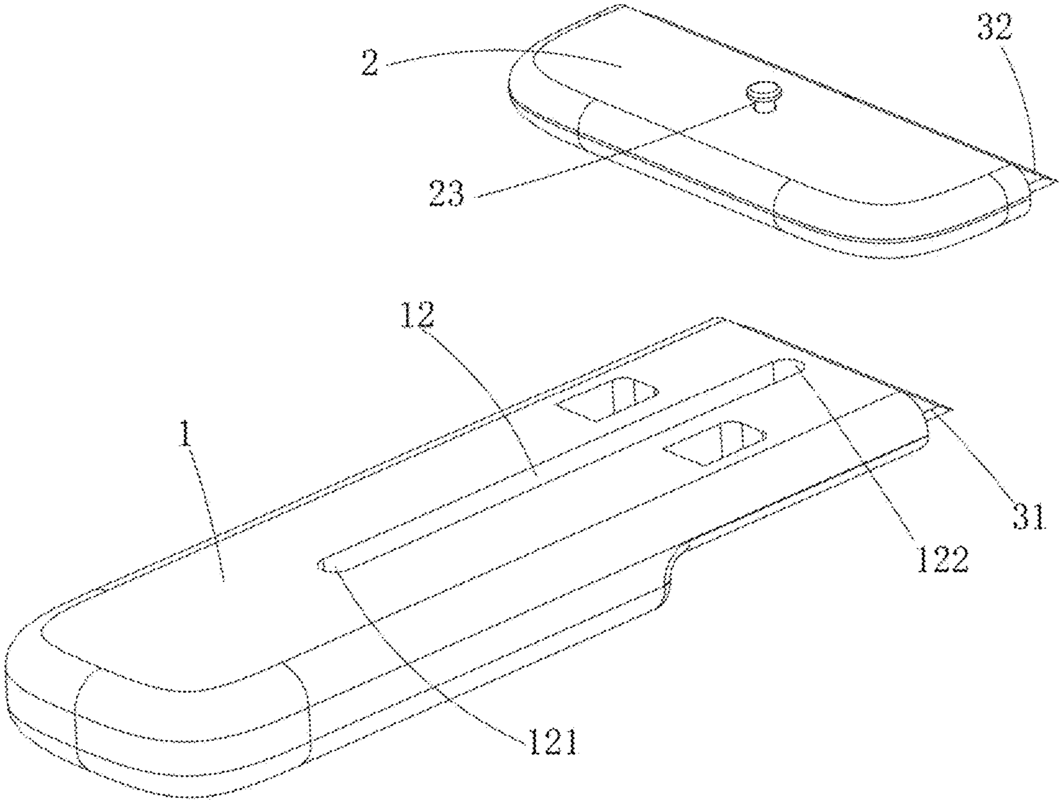
FIG. 23 is an exploded view of the scraper body and the scraper component according to Embodiment X of the present disclosure.
Figure 25:
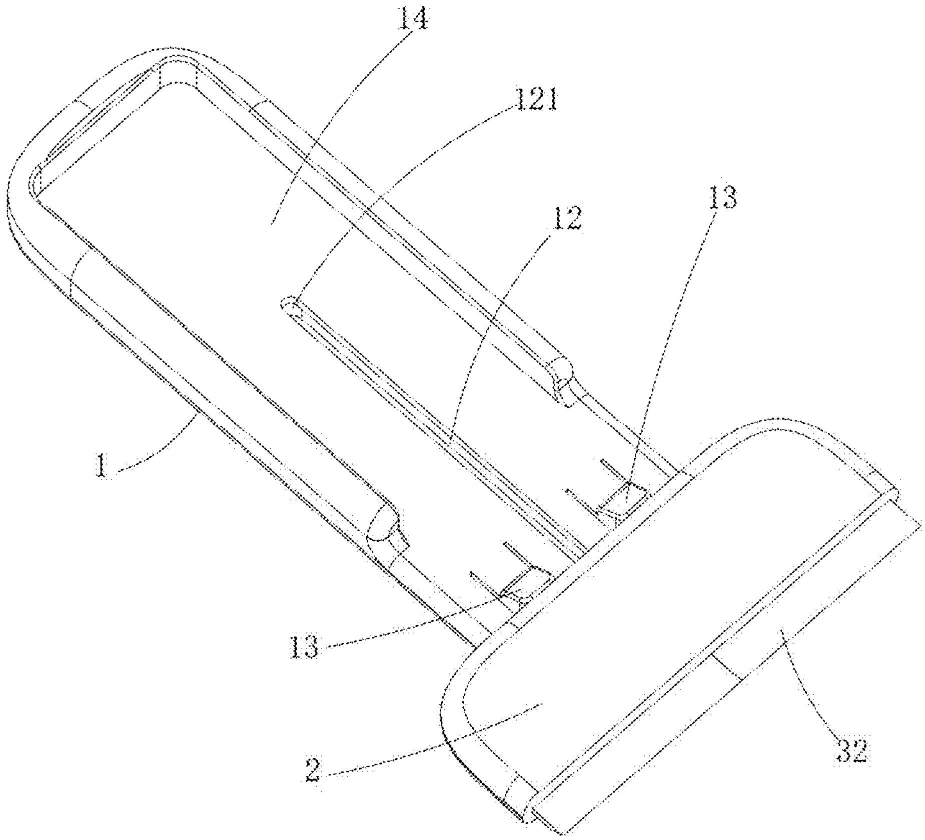
FIG. 25 is another schematic view of the overall structure of the scraper of Embodiment X, showing the scraper in the first assembled state.

The scraper body 1 may further be arranged with an elastic arm and a limiting boss 13 arranged on the elastic arm. When the scraper is in the first assembled state and the second blade 32 is in the usable state, the limiting boss 13 may abut against an end wall of the scraper component 2 away from the second blade 32 to limit a rotation and sliding of the guide post 23. Specifically, the limiting boss 13 may have a limiting wall 130 and a guide wall 131 arranged facing away from the limiting wall 30. The guide wall 131 may be inclined towards the first end 121 of the guide hole 12, and the limiting wall 130 may be perpendicular to an outer wall face of the scraper body 1. When the scraper is in the first assembled state, the limiting wall 130 may abut against the scraper component 2, enabling the second blade 32 to remain in the usable state, and in this way, the second blade 32 can be used for work. When the scraper component 2 is at the second end 122 of the guide hole 12, a distance by which the second blade 32 extends from the scraper body 1 may be greater than a distance by which the first blade 31 extends from the scraper body 1, and thus only the second blade 32 can be used for work, avoiding an excessive extension of the first blade 31 interfering with the work of the second blade 32. In addition, the inclined guide wall 131 ensures that when the scraper component 2 slides from the first end 121 to the second end 122, an outer wall of the scraper component 2 presses against the limiting boss 13, forcing the scraper component 2 to move aside. In order to improve the stability of the scraper component 2 at a corresponding position when the scraper is in the first assembled state, two limiting bosses 13 can be arranged, and the two limiting bosses 13 are symmetrically formed on both sides of the guide hole 12. A switching manner of the scraper from the first assembled state to the original working state needs to be classified and discussed according to a structure of the guide hole 12:

As shown in FIG. 23, FIG. 24, and FIG. 25, the guide hole 12 may be a straight strip-shaped hole, and the guide hole 12 may be formed along a central axis of the scraper body 1. The guide post 23 can rotate relative to the scraper body 1 via the guide hole 12 and can slide along the length direction of the guide hole 12. When the scraper is in the first assembled state, the scraper component 2 may be restricted by the limiting wall 130 and cannot rotate, remaining in the usable state. By pressing the limiting boss 13, the restriction on the end wall of the scraper component 2 by the limiting wall 130 can be released. The scraper component 2 can be rotated until the width direction of the scraper component 2 turns to be approximately parallel to the length direction of the scraper body 1, and then the scraper component 2 can be slid from the second end 122 to the first end 121 of the guide hole 12, until the guide post 23 is positioned at the first end 121 of the guide hole 12, that is, the scraper switches to the original working state. In order to keep the scraper in the original working state, the scraper body 1 may also define a second accommodating groove 14 at an end away from the first blade 31. When the scraper is in the original working state, that is, when the first blade 31 is in the usable state, the scraper component 2 and the second blade 32 may be received in the second accommodating groove 14.

Figure 26:
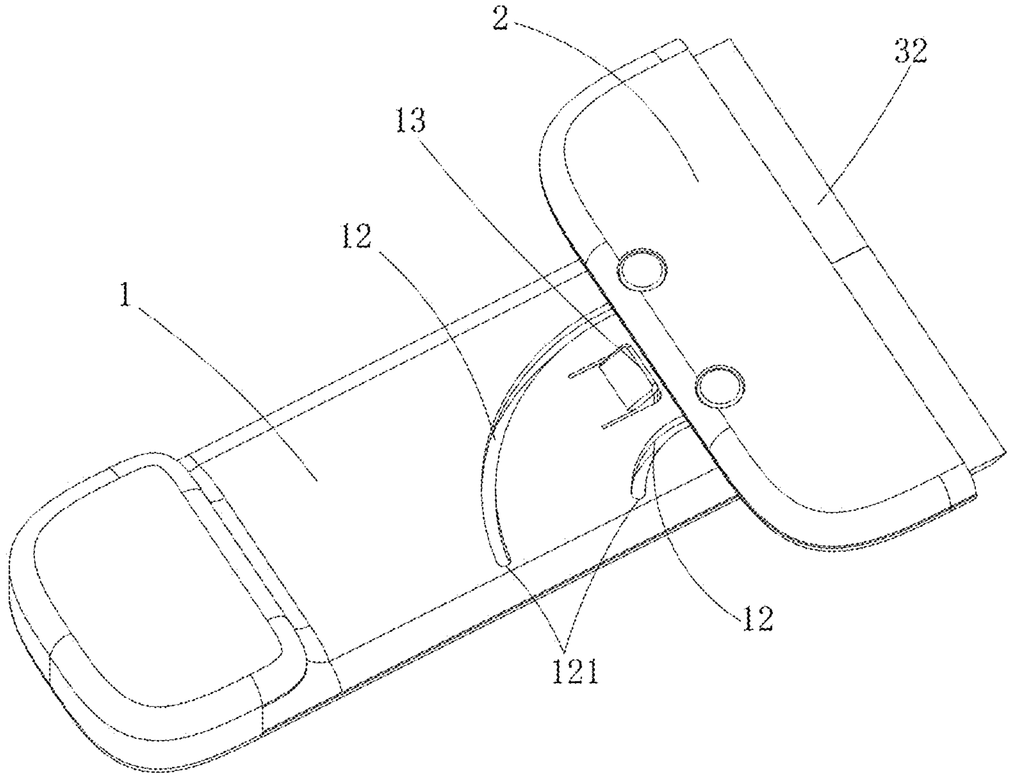
FIG. 26 is a schematic view of the overall structure of the scraper according to Embodiment XI of the present disclosure, showing the scraper in the first assembled state.

As shown in FIG. 26 and FIG. 27, at least two guide holes 12 and at least two guide posts 23 may be provided. Each of the at least two guide holes 12 may be an arc hole. The at least two guide holes 12 are concentrically formed with different radii. The at least two guide posts 23 can simultaneously rotate and slide along the arc trajectory of the at least two corresponding guide holes 12 in a one-to-one correspondence, and in this way, the scraper component 2 can be rotated to switch the second blade 32 to the usable or unusable state, thereby improving the connection stability between the scraper component 2 and the scraper body 1. As shown in FIG. 26, when the scraper is in the first assembled state, the scraper component 2 may be restricted by the limiting wall 130 and cannot swing along the length direction of the guide hole 12, remaining in the usable state. By pressing the limiting boss 13, the restriction on the end wall of the scraper component 2 by the limiting wall 130 can be released. At this time, the guide post 23 can slide along the length direction of the guide hole 12 from the second end 122 to the first end 121. That is, the scraper component 2 can swing from the width direction of the scraper component 2 perpendicular to the length direction of the scraper body 1 to the width direction of the scraper component 2 approximately parallel to the length direction of the scraper body 1, meaning the scraper switches to the original working state. When the scraper component 2 is in a state where the width direction of the scraper component 2 approximately parallel to the length direction of the scraper body 1, the scraper component 2 may press down the limiting boss 13, enabling the limiting boss 13 to always abut against an outer wall of the scraper component 2 where the guide post 23 may be arranged, and one end of the guide post 23 in the guide hole 12 can axially fasten the scraper body 1 via the guide hole 12, thereby stably maintaining the scraper component 2 in a position where the width direction of the scraper component 2 is approximately parallel to the length direction of the scraper body 1, that is, the scraper stably remains in the original working state.

The technical solution of the present disclosure may be further described below, referencing the above content and specific embodiments.

As shown in Embodiment I in FIGS. 1-14, the scraper in this embodiment may include a scraper body 1 and a scraper component 2. The scraper body 1 may be arranged with a first blade 31. The scraper component 2 may be arranged with a second blade 32. A width of the second blade 32 may be not equal to a width of the first blade 31. In this embodiment, the width of the second blade 32 may be greater than the width of the first blade 31, and the second blade 32 may be composed of two first blades 31 arranged side by side, particularly along a with direction of the second blade 32. In addition, a bottom face 100 of the connecting end 10 of the scraper body 1 may be arranged with a mounting member 5 with a width approximately the same with a width of the first blade 31 to facilitate fixation of the first blade 31 on the scraper body 1. The scraper component 2 may be arranged with another mounting member 5 with a width approximately the same as a width of two first blades 31 arranged side by side for fixation of the second blade 32 with a width twice the width of the first blade 31 on the scraper component 2. When the scraper component 2 is detached from the scraper body 1, the scraper may be in an original working state, the first blade 31 may be in a usable state, and the second blade 32 may be in an unusable state. When the scraper component 2 is assembled on the scraper body 1, the scraper may have a first assembled state, a second assembled state, or a third assembled state, and the second blade 32 may be in the usable state. Specifically, the scraper body 1 may include a connecting end 10, and the scraper component 2 may define a connecting cavity 20. The connecting cavity 20 may include a first cavity 201, a second cavity 202, and an opening 200 located on one side of the first cavity 201. Through the opening 200, the connecting end 10 with the first blade 31 mounted can be inserted in the connecting cavity 20, enabling the first blade 31 to be placed in the second cavity 202, and the connecting end 10 to be engaged in the first cavity 201. The connecting end 10 may be not easy to detach from the connecting cavity 20 through the opening 200 due to the engagement of the connecting protrusion 102 and the first limiting hole 205, enabling the scraper to remain in the first assembled state, and the second blade 32 which has a greater width can be used for cleaning work. Conversely, after the scraper component 2 is removed from the connecting end 10, the first blade 31 may be exposed, enabling the scraper to switch to the original working state, and the first blade 31 which has a smaller width can be used for cleaning work. In this embodiment, a second limiting hole 206, which is staggered with the first limiting hole 205 in a second direction D2, may be also defined in the top wall 204 for defining the connecting cavity 20. By passing the connecting end 10 through the scraper component 2 from the first limiting hole 205 towards the second limiting hole 206, the scraper can have a second assembled state and a third assembled state. When the scraper is in the second assembled state and the third assembled state, the second blade 32 on the scraper component 2 may have different angles with the scraper body 1. In this way, the scraper in these two states can perform cleaning work on inclined planes.

Figure 4:
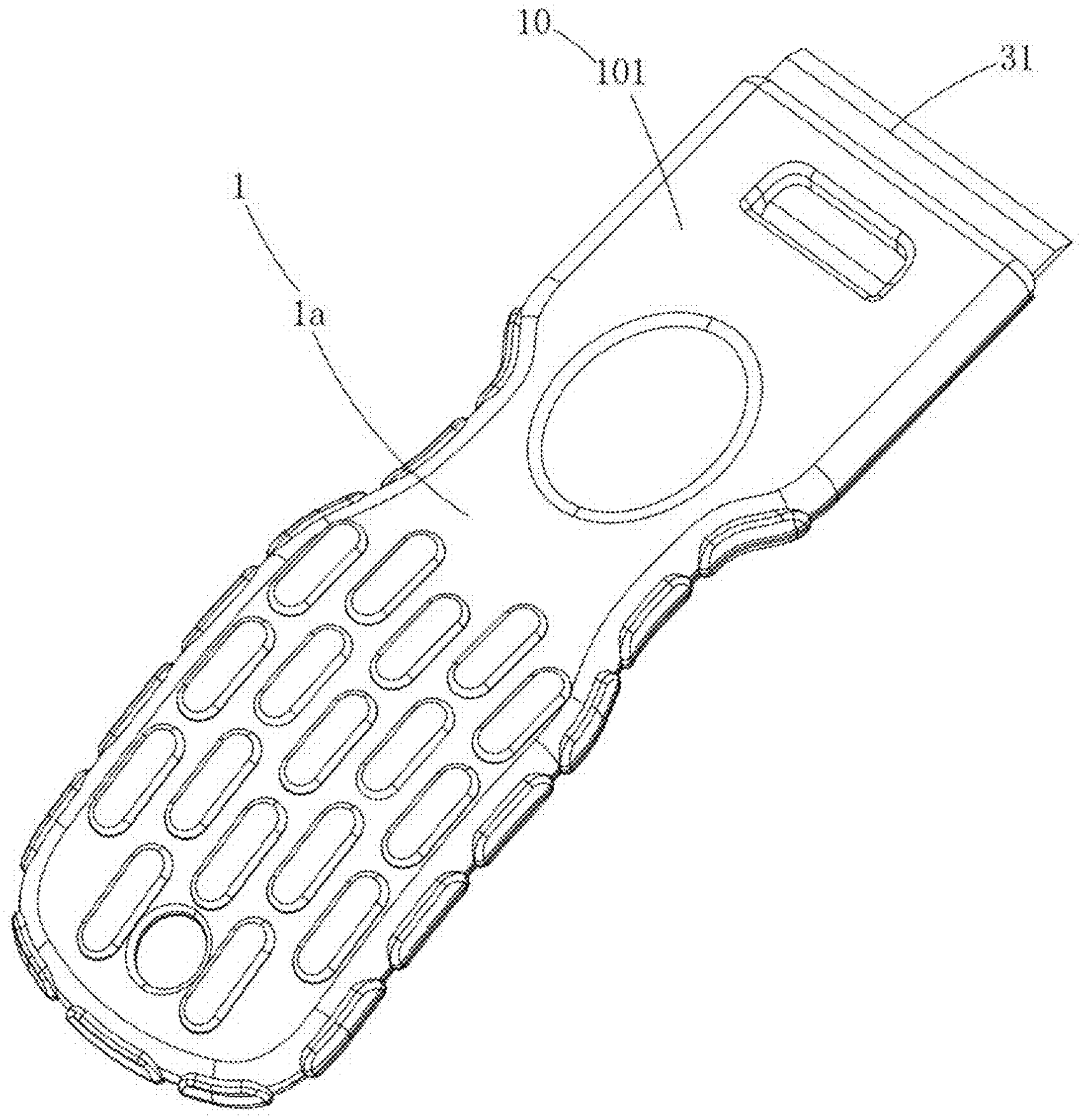
FIG. 4 is another schematic view of the overall structure of the scraper in Embodiment I, showing the scraper in an original working state.

As shown in FIG. 4, when the scraper is in the original working state, the first blade 31 can be in the usable state. At this time, the scraper component 2 may be stored in the user's backpack or placed in a position that does not affect work.

As shown in FIG. 1, when the scraper is in the first assembled state, the second blade 32 can be in the usable state, the scraper component 2 may serve as an axial extension member of the scraper body 1, and the second blade 32 may remain approximately parallel to the scraper body 1. When the scraper body 1 is held to push the scraper, the first blade 31 may be received in the connecting cavity 20 of the scraper component 2 without being affected and without interfering with the second blade 32, and the second blade 32 can smoothly clean a face to be cleaned.

Figure 9:
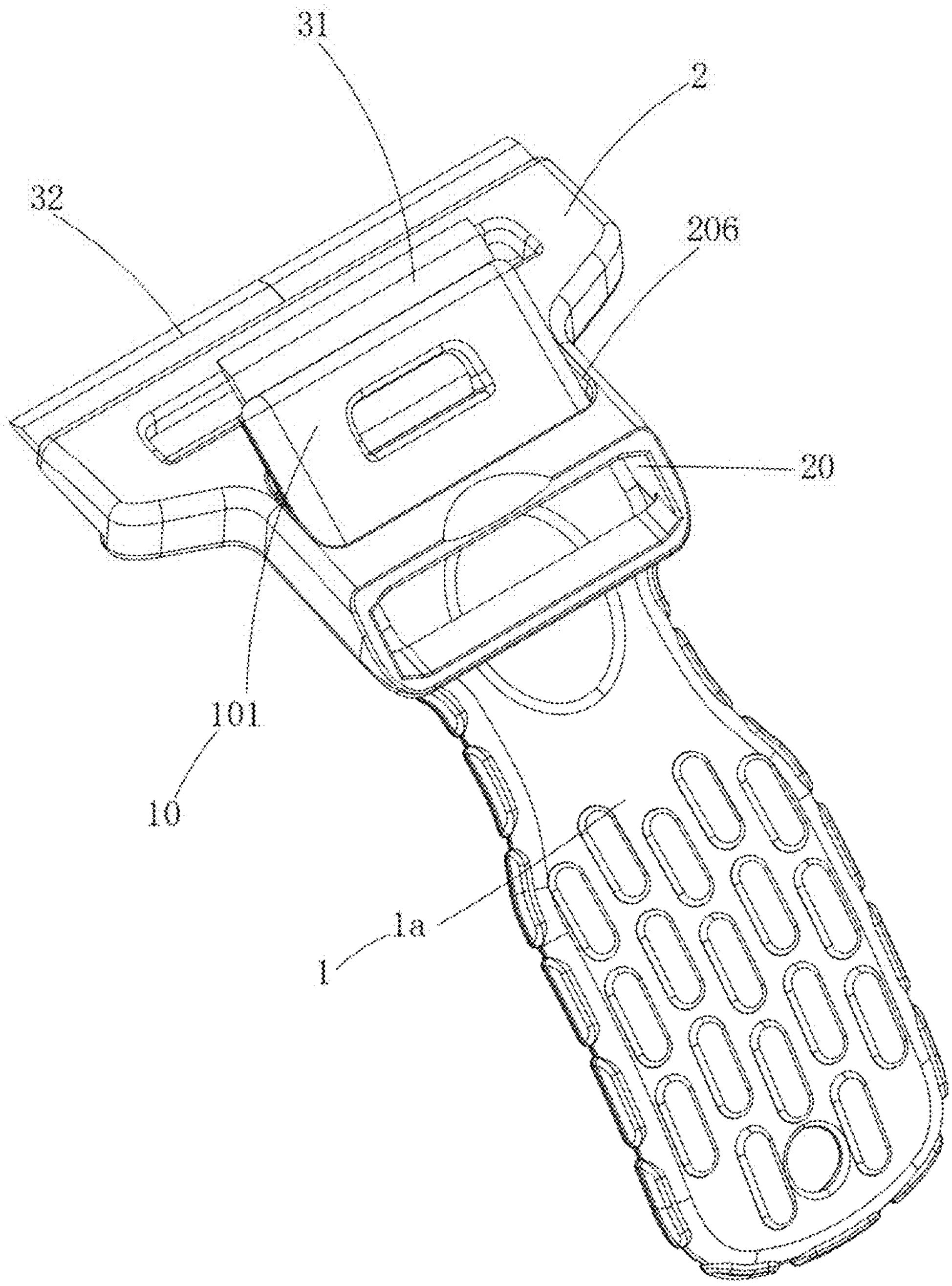
FIG. 9 is further another schematic view of the overall structure of the scraper of Embodiment I, showing the scraper in a second assembled state.

As shown in FIG. 9, when the scraper is in the second assembled state, the second blade 32 can be in the usable state. The connecting end 10 passes through the first limiting hole 205, the connecting cavity 20, and the second limiting hole 206, and the bottom face 100 of the connecting end 10 may face the scraper component 2. In this case, the second blade 32 may form a first included angle α with the scraper body 1. When the scraper body 1 is held to push the scraper, the first blade 31 may be on a side of the scraper component 2 away from the surface to be cleaned, which does not interfere with normal work of the second blade 32, and formation of the first included angle α can allow the scraper to be used on inclined faces to be cleaned.

Figure 13:
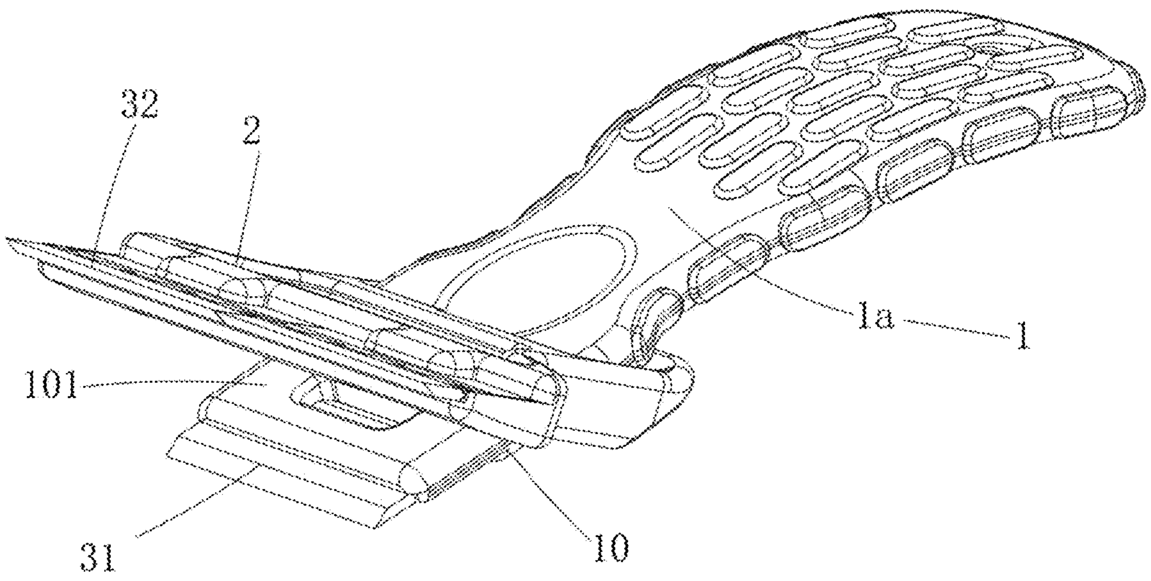
FIG. 13 is further another schematic view of the overall structure of the scraper of Embodiment I, showing the scraper in the third assembled state.

As shown in FIG. 12 and FIG. 13, when the scraper is in the third assembled state, both the first blade 31 and the second blade 32 can be in the usable state. The connecting end 10 may pass through the first limiting hole 205, the connecting cavity 20, and the second limiting hole 206, and the top face 101 of the connecting end 10 may face the scraper component 2. In this case, the second blade 32 may form a second included angle β with the scraper body 1. The user can choose to hold the scraper body 1 in a direction shown in FIG. 12, and thus the wider second blade 32 may face the plane to be cleaned. In this case, the first blade 31 is on the side of the scraper component 2 away from the surface to be cleaned, which will not affect the use of the second blade 32. Conversely, the user can also choose to hold the scraper body 1 in the direction shown in FIG. 13, and thus the narrower first blade 31 faces the face to be cleaned. In this case, the scraper component 2 may be on the side of the scraper body 1 away from the face to be cleaned, which does not affect the use of the first blade 31.

Figure 6:
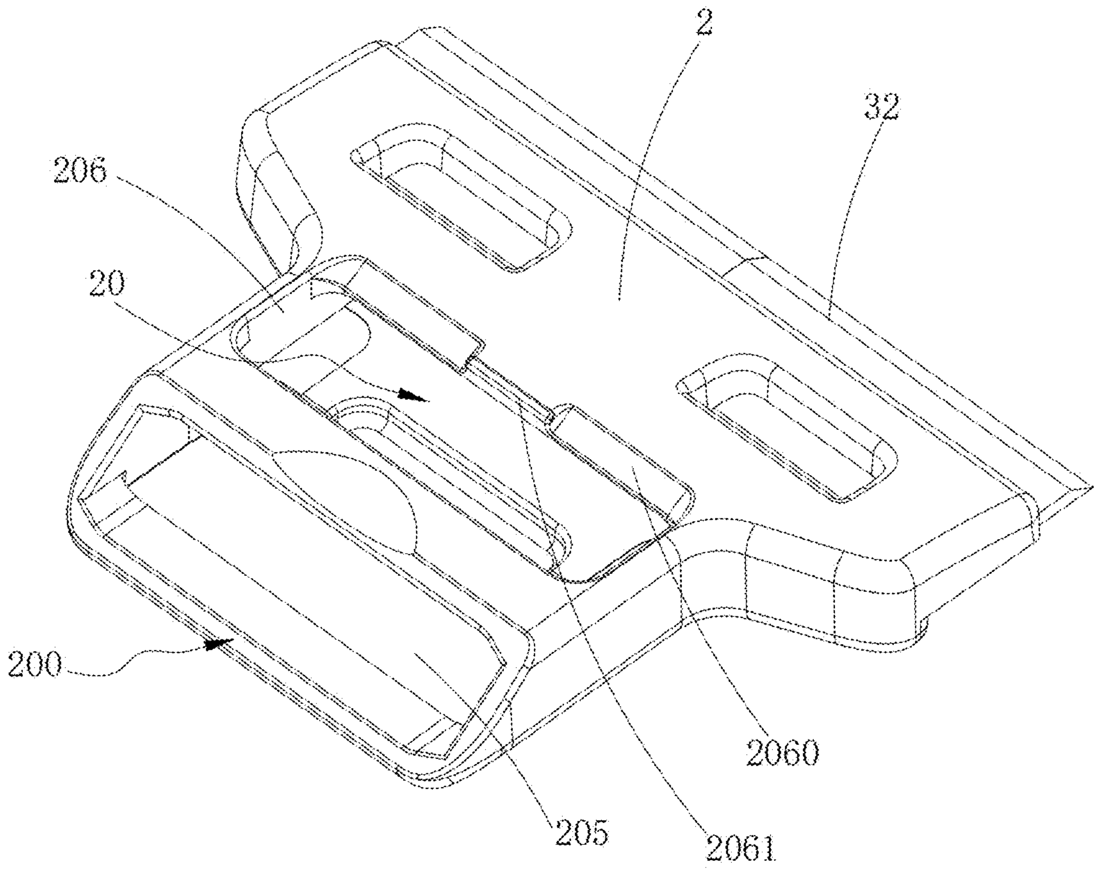
FIG. 6 is a structural view of the scraper component according to Embodiment I and Embodiment II of the present disclosure.

As shown in Embodiment II in FIG. 6 and FIG. 7, Embodiment II of the present disclosure also provides an accessory for a scraper. This accessory may include a scraper component 2 and a second blade 32 arranged on the scraper component 2. A structure of the scraper component 2 in this embodiment may be the same as the structure of the scraper component 2 in Embodiment I. In actual application, when a user has a scraper body 1 as described in Embodiment I or a similar scraper, they can purchase this accessory separately and assemble the accessory on the corresponding scraper to expand usage manners of the scraper.

As shown in Embodiment III in FIG. 15, the scraper in this embodiment may be substantially the same as the scraper in Embodiment I described above, and the similarities will not be repeated here. The main difference between the two embodiments may be that this scraper does not have the first limiting hole 205 and the second limiting hole 206, meaning that this scraper may only have the original working state and the first assembled state. In addition, the connecting cavity 20 in this embodiment may have a side opening 207, which can allow the scraper component 2 to be mounted on or removed from the connecting end 10 of the scraper body 1 more quickly.

As shown in Embodiment IV in FIG. 16, the scraper in this embodiment may be substantially the same as the scraper in Embodiment I described above, and the similarities will not be repeated here. The main difference between the two embodiments may be that this scraper may not have the first limiting hole 205 and the second limiting hole 206, meaning that this scraper may only have the original working state and the first assembled state. In addition, this embodiment may adopt two elastic snapping fasteners 105 arranged side by side on the top face 101 of the connecting end 10, and two corresponding fastening through-holes 208 may be defined in the top wall 204 for defining the connecting cavity 20. Through the snap-fit engagement of the elastic snapping fasteners 105 in the fastening through-holes 208 in a one-to-one correspondence, the scraper can be maintained in the first assembled state.

As shown in Embodiment V in FIG. 17, the scraper in this embodiment may be substantially the same as the scraper in Embodiment IV described above, and the similarities will not be repeated here. The main difference between the two embodiments may be that in this embodiment, each of the two elastic snapping fasteners 105 may be distributed on a respective one of two opposing outer walls of the connecting end 10, and each fastening through-hole 208 may be defined in a respective one of two opposing side walls for defining the connecting cavity 20. Through the snap-fit engagement of the elastic snapping fasteners 105 in the fastening through-holes 208, the scraper can be maintained in the first assembled state.

As shown in Embodiment VI in FIG. 18, the scraper in this embodiment may be substantially the same as the scraper in Embodiment I described above, and the similarities will not be repeated here. The main difference between the two embodiments may be that this scraper may not have the first limiting hole 205 and the second limiting hole 206, meaning that this scraper may only have the original working state and the first assembled state. In addition, in this embodiment, the outer wall of the connecting end 10 may define an annular groove 107, and the inner wall for defining the connecting cavity 20 may be arranged with an annular protrusion 209 that can be engaged in the annular groove 107. Through the engagement of the annular protrusion 107 in the annular groove 209, the scraper can be maintained in the first assembled state.

As shown in Embodiment VII in FIG. 19, the scraper in this embodiment may be substantially the same as the scraper in Embodiment I described above, and the similarities will not be repeated here. The main difference between the two embodiments may be that this scraper may not have the first limiting hole 205 and the second limiting hole 206, meaning that this scraper may only have the original working state and the first assembled state. In addition, in this embodiment, two limiting screw holes 106 may be defined in the top face 101 of the connecting end 10. After the connecting end 10 is inserted in the connecting cavity 20, two limiting bolts 400 can be threadedly connected to the scraper body 1 via the two corresponding limiting screw holes 106 in a one-to-one correspondence after passing through the top wall 204 of the connecting cavity 20, allowing the scraper to be maintained in the first assembled state.

As shown in Embodiment VIII in FIG. 20 and FIG. 21, the scraper in this embodiment may be substantially the same as the scraper in Embodiment I described above, and the similarities will not be repeated here. The main difference between the two embodiments may be that this scraper may not have the first limiting hole 205 and the second limiting hole 206, meaning that this scraper may only have the original working state and the first assembled state. In addition, the top wall 204 for defining the connecting cavity 20 in this embodiment may be removed to form an open cavity, and one magnetic member 401 may be mounted on the bottom wall 203 for defining the connecting cavity 20, and the other magnetic member 401 may be mounted on the bottom face 100 of the connecting end 10. Through the magnetic attraction of the two magnetic members 401, the scraper component 2 may be not easy to detach from the scraper body 1 in the thickness direction of the scraper component 2. In addition, an L-shaped hook 15 can also be arranged on the bottom face 100 of the connecting end 10. When the scraper is in the first assembled state, the L-shaped hook 15 can be engaged with the bottom wall 203 for defining the connecting cavity 20 in a snap-fit manner, further improving the connection stability of the scraper component 2 with the scraper body 1 in the thickness direction of the scraper component 2.

As shown in Embodiment IX in FIG. 22, the scraper in this embodiment may be substantially the same as the scraper in Embodiment I described above, and the similarities will not be repeated here. The main difference between the two embodiments may be that this scraper may not have a connecting cavity 20, a first limiting hole 205, and a second limiting hole 206, meaning that this scraper may only have an original working state and a first assembled state. Moreover, in this embodiment, an insertion fastener 21 may be arranged on the scraper component 2, and an insertion hole 11 may be formed the scraper body 1. Through the snap-fit engagement of the insertion fastener 21 in the insertion hole 11, the scraper can be maintained in the first assembled state. In addition, a first accommodating recess 22 may be also formed in the scraper component 2, enabling the end of the scraper body 1 to be embedded in the first accommodating recess 22, and the first blade 31 may be accommodated in the first accommodating recess 22, which not only improves the connection stability of the scraper body 1 and the scraper component 2, but also ensures that when the scraper is in the first assembled state, the first blade 31 may be received.

As shown in Embodiment X in FIG. 23, FIG. 24, and FIG. 25, the scraper in this embodiment may be substantially the same as the scraper in Embodiment I described above, and the similarities will not be repeated here. The main difference between the two embodiments may be that this scraper may not have a connecting cavity 20, a first limiting hole 205, and a second limiting hole 206, meaning that this scraper may only have the original working state and the first assembled state. In this embodiment, a guide hole 12 which may be straight and strip-shaped may be formed in the scraper body 1, and a guide post 23 matched with the guide hole 12 may be arranged on the scraper component 2. When the scraper is in the first assembled state, the scraper component 2 may be located on one end of the scraper body 1 arranged with the first blade 31, and the scraper component 2 may be restricted by the limiting boss 13 to maintain the width direction of the scraper component 2 approximately perpendicular to the length direction of the scraper body 1. In this case, the second blade 32 on the scraper component 2 may extend from the scraper body 1 by a distance greater than a distance by which the first blade 31 may extend from the scraper body 1, and the second blade 32 can be used for cleaning work. When it is necessary to switch to the original working state, by pressing the limiting boss 13, the scraper component 2 can be rotated to a state where the width direction of the scraper component 2 is parallel to the length direction of the scraper body 1, and then the scraper component 2 can be slid to the second accommodating groove 14. At this time, the scraper component 2 and the second blade 32 on the scraper component 2 are received, and the first blade 31 may be exposed for work.

As shown in Embodiment XI in FIG. 26 and FIG. 27, the scraper in this embodiment may be substantially the same as the scraper in Embodiment X described above, and the similarities will not be repeated here. The main difference between the two embodiments may be that the guide hole 12 in this embodiment may be an arc-shaped hole, and there are two guide holes 12. The two guide holes 12 are distributed concentrically to improve the connection stability between the scraper body 1 and the scraper component 2. The scraper component 2 can slide along the length direction of the guide hole 12. When the scraper component 2 is at the first end 121 of the guide hole 12, the scraper can be in the original working state, and the scraper component 2 may be restricted by the limiting boss 13 and the guide post 23 to remain in a position where the width direction of the scraper component 2 may be approximately parallel to the length direction of the scraper body 1. When the scraper component 2 is at the second end 122 of the guide hole 12, the second blade 32 on the scraper component 2 may be exposed from the scraper body 1, and the scraper may be in the first assembled state. The scraper component 2 may be restricted by the limiting wall 130 of the limiting boss 13 to remain in a position where the width direction of the scraper component 2 is approximately perpendicular to the length direction of the scraper body 1.

Obviously, the embodiments described above are only a part of the embodiments of the present disclosure, and not all of them. The accompanying drawings give some embodiments of the present disclosure, but do not limit the patentable scope of the disclosure, which may be realized in many different forms. Rather, these embodiments are provided for the purpose of providing a more thorough and comprehensive understanding of the present disclosure. Although the present disclosure has been described in detail with reference to the foregoing embodiments, it is still possible for a person skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the patent protection of the present disclosure.

What is claimed is:

1. A scraper, comprising:

a scraper body, arranged with a first blade; and a scraper component, arranged with a second blade, wherein a width of the second blade is unequal to a width of the first blade;

wherein the scraper is configured to switch assembly states between using the first blade and using the second blade;

wherein when the scraper body and the scraper component are in a separated state, the first blade is in a usable state;

wherein when the scraper body and the scraper component are in an assembled state, the second blade is in the usable state;

an end of the scraper component away from the second blade is arranged with a connecting portion; the first blade is arranged at a connecting end of the scraper body; and when the scraper body and the scraper component are in the assembled state, the connecting end of the scraper body is connected to the connecting portion of the scraper component, and a cutting edge of the first blade and a cutting edge of the second blade face away from the connecting end.

2. The scraper according to claim 1, wherein the scraper component defines a connecting cavity;

the assembled state comprises a first assembled state, and when the scraper is in the first assembled state, the connecting end is inserted in the connecting cavity, the first blade is received in the connecting cavity, and the first blade is in the unusable state.

3. The scraper according to claim 2, wherein a cavity wall for defining the connecting cavity defines a first limiting hole, the connecting end is arranged with a connecting protrusion, and when the scraper is in the first assembled state, the connecting protrusion is engaged in the first limiting hole.

4. The scraper according to claim 2, wherein the scraper component comprises a bottom wall and a top wall which are arranged opposite each other and cooperatively define the connecting cavity, the connecting end comprises a bottom face and a top face, and when the scraper is in the first assembled state, the bottom face faces the bottom wall, and the top face faces the top wall;

the bottom wall defines a first limiting hole, the top wall defines a second limiting hole, each of the first limiting hole and the second limiting hole is communicated to the connecting cavity;

the assembled state further comprises a second assembled state and a third assembled state;

when the scraper is in the second assembled state, the connecting end passes through the first limiting hole, the connecting cavity, and the second limiting hole, the bottom face faces the scraper component, and the second blade is in the usable state;

when the scraper is in the third assembled state, the connecting end passes through the first limiting hole, the connecting cavity, and the second limiting hole, the top face faces the scraper component, and both the first blade and the second blade are in the usable state.

5. The scraper according to claim 4, wherein the scraper component comprises a first inclined wall and second inclined wall which are arranged opposite each other and cooperatively define the first limiting hole, and the scraper component comprises a third inclined wall which is coplanar with the second inclined wall and defines the second limiting hole;

when the scraper is in the second assembled state, the bottom face abuts against the second inclined wall and the third inclined wall, and the top face abuts against the first inclined wall;

when the scraper is in the third assembled state, the bottom face abuts against the first inclined wall, and the top face abuts against the second inclined wall and the third inclined wall.

6. The scraper according to claim 5, wherein the bottom face defines a first engaging recess, the third inclined wall is arranged with a limiting protrusion configured to be engaged in the first engaging recess, so that the third inclined wall maintains the scraper in the second assembled state.

7. The scraper according to claim 4, wherein when the scraper is in the third assembled state, a connecting protrusion is located in the connecting cavity, and the connecting protrusion abuts against the top wall and prevents the connecting end from disengaging from the scraper component through the second limiting hole.

8. The scraper according to claim 4, wherein the bottom face is arranged with an abutting protrusion, and when the scraper is in the third assembled state, the abutting protrusion is located out of the connecting cavity, and the abutting protrusion abuts against an inner wall for defining the second limiting hole and prevents the connecting end from disengaging from the scraper component through the second limiting hole.

9. The scraper according to claim 2, wherein the scraper component defines a through-inclined hole, the inclined hole is isolated from the connecting cavity, and when the connecting end passes through the inclined hole, at least one of the first blade and the second blade is in the usable state.

10. The scraper according to claim 2, wherein the connecting cavity has an opening communicated with an outside, the connecting cavity comprises a first cavity and a second cavity communicated with the first cavity, the second cavity is located on a side of the first cavity away from the opening, a thickness of the first cavity is greater than a thickness of the second cavity, and an inner wall for defining the first cavity close to the second cavity is recessed to form a limiting face facing the opening;

when the scraper is in the first assembled state, the first blade is located in the second cavity, an end wall of the connecting end abuts against the limiting face and an abutment between the end wall of the connecting end and the limiting face limits a movement of the connecting end to the second cavity.

11. The scraper according to claim 2, wherein the connecting cavity has an opening longitudinally formed and a side opening laterally formed;

the side opening is located between the opening and the second blade, and the side opening penetrates through a side wall for defining the connecting cavity;

the connecting end is configured to be inserted in the connecting cavity through the side opening.

12. The scraper according to claim 2, wherein the connecting end is arranged with at least two elastic snapping fasteners, an inner wall for defining the connecting cavity defines at least two fastening through-holes, each of the at least two elastic snapping fasteners is engaged in a respective one of the at least two fastening through-holes in a snap-fit manner; the number of the at least two elastic snapping fasteners is two;

the two elastic snapping fasteners are spaced apart from each other and arranged on a same outer wall of the connecting end or, each of the two elastic snapping fasteners is arranged on a respective one of two opposing outer walls of the connecting end.

13. The scraper according to claim 1, wherein the scraper body defines an insertion hole, the scraper component comprises an insertion fastener and defines a first accommodating recess, the first accommodating recess is configured to accommodate one end of the scraper body where the first blade is mounted, and the insertion hole is configured to accommodate the insertion fastener in a snap-fit manner.

14. The scraper according to claim 1, wherein the scraper body defines at least one guide hole, the scraper component comprises at least one guide post, the at least one guide hole extends along a length direction of the scraper body, the at least one guide hole comprises a first end and a second end away from each other, the first end is arranged away from the first blade, the at least one guide post is configured to slide along a length direction of the at least one guide hole, and the at least one guide post is configured to rotate relative to the scraper body through the at least one guide hole;

when the first blade is in the usable state, the at least one guide post is positioned at the first end of the at least one guide hole, and the scraper component and the second blade are assembled with the scraper body;

when the second blade is in the usable state, the at least one guide post is positioned at the second end of the at least one guide hole, and the scraper component and the second blade extend out from the scraper body.

15. The scraper according to claim 14, wherein the scraper body is further arranged with an elastic arm and a limiting boss arranged on the elastic arm, and when the second blade is in the usable state, the limiting boss abuts against an end wall of the scraper component away from the second blade and limits a rotation and sliding of the at least one guide post.

16. The scraper according to claim 14, wherein an end of the scraper body away from the first blade defines an accommodating groove, and when the first blade is in the usable state, the scraper component and the second blade are received in the accommodating groove.

17. The scraper according to claim 14, wherein the number of the at least one guide hole is at least two, and the number of the at least one guide post is at least two;

each of the at least two guide holes is an arc hole, and the at least two guide holes are concentrically formed with different radii;

the at least two guide posts are configured to simultaneously rotate and slide along arc trajectories of the at least two guide holes in a one-to-one correspondence.

18. An accessory for a scraper, the scraper comprising a first blade, wherein the accessory comprises:

a scraper component, configured to be detachably connected to the scraper; and a second blade, arranged on the scraper component, wherein a width of the second blade is greater than a width of the first blade;

when the scraper component is connected to the scraper, the second blade is in a usable state, or both the first blade and the second blade are in the usable state;

wherein the scraper component defines a connecting cavity, and the scraper is detachably connected to the scraper component through the connecting cavity;

when the scraper component is connected to the scraper through the connecting cavity, the first blade is received in the connecting cavity, and the second blade is in the usable state.

19. The accessory for a scraper according to claim 18, wherein the scraper component defines a connecting cavity and comprises a bottom wall and a top wall which are arranged opposite each other and cooperatively define the connecting cavity, the bottom wall defines a first limiting hole, the top wall defines a second limiting hole, and each of the first limiting hole and the second limiting hole is communicated to the connecting cavity;

a minimum distance between the second limiting hole and the second blade is unequal to a minimum distance between the first limiting hole and the second blade, and the first limiting hole, the connecting cavity, and the second limiting hole are configured for at least a portion of the scraper to pass through;

when the scraper component sleeves the scraper through the first limiting hole, the connecting cavity, and the second limiting hole, the second blade is in the usable state, or both the first blade and the second blade are in the usable state.

* * * * *